United States Patent
Itagaki et al.

(10) Patent No.: US 10,024,373 B2
(45) Date of Patent: Jul. 17, 2018

(54) CLUTCH SYSTEM

(71) Applicant: TOYOTA JIDOSHA KABUSHIKI KAISHA, Toyota-shi, Aichi-ken (JP)

(72) Inventors: Kenji Itagaki, Shizuoka-ken (JP); Naofumi Magarida, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 58 days.

(21) Appl. No.: 15/072,935

(22) Filed: Mar. 17, 2016

(65) Prior Publication Data

US 2017/0009820 A1 Jan. 12, 2017

(30) Foreign Application Priority Data

Jul. 10, 2015 (JP) ................................ 2015-139111

(51) Int. Cl.
*F16D 48/06* (2006.01)
*F16D 41/12* (2006.01)
*F16D 41/14* (2006.01)

(52) U.S. Cl.
CPC ........... *F16D 48/06* (2013.01); *F16D 41/125* (2013.01); *F16D 41/14* (2013.01); *F16D 2500/10493* (2013.01)

(58) Field of Classification Search
CPC ..... F16D 2500/10493; F16D 2500/104; F16D 2500/1023; F16D 41/14
See application file for complete search history.

(56) References Cited

U.S. PATENT DOCUMENTS

| 6,719,109 | B1* | 4/2004 | Li | ............................ F16H 3/66 192/3.52 |
| 7,491,151 | B2* | 2/2009 | Maguire | ............... B60W 10/02 477/107 |
| 9,073,547 | B1* | 7/2015 | Ortmann | ............... B60W 20/20 |
| 2008/0223681 | A1* | 9/2008 | Stevenson | ............. B60K 6/365 192/43 |
| 2016/0031439 | A1* | 2/2016 | Nefcy | .................... B60K 6/387 477/5 |

FOREIGN PATENT DOCUMENTS

| JP | 2002-514292 A | 5/2002 |
| JP | 2008-014333 A | 1/2008 |
| JP | 2008082477 A | 4/2008 |
| JP | 2010052517 A | 3/2010 |
| JP | 2015077846 A | 4/2015 |
| WO | 98/49456 A1 | 11/1998 |
| WO | 2015056087 A1 | 4/2015 |

* cited by examiner

*Primary Examiner* — Huan Le
*Assistant Examiner* — Lori Wu
(74) *Attorney, Agent, or Firm* — Hunton Andrews Kurth LLP

(57) ABSTRACT

A clutch system of the present invention executes, when switching a selectable one-way clutch from a lock mode to a free mode, an early mode switching control where while a selector plate is made go into a waiting state that a pawl member protruding from a fixed plate is abutting against a non-formation portion, a negative torque is made to act on a rotational plate in a negative rotational direction, and, by controlling the negative torque, the selector plate of the waiting state is made to rotate up to a release position.

9 Claims, 18 Drawing Sheets

EARLY MODE SWITCHING CONTROL

NORMAL MODE SWITCHING CONTROL

CLUTCH SYSTEM

CROSS-REFERENCE TO RELATED APPLICATION

The present application claims priority to Japanese Patent Application No. 2015-139111 filed on Jul. 10, 2015, which is incorporated herein by reference in its entirety.

TECHNICAL FIELD

The present invention relates to a clutch system including a selectable one-way clutch which is capable of performing selectively a function of a one-way clutch.

BACKGROUND ART

As a selectable one-way clutch, known is such a selectable one-way clutch that a fixed plate where pawl members are provided protrudably, a rotational plate where recesses are formed for engaging with the pawl members respectively, and a selector plate provided between the mentioned two plates are provided on a shared axial line (the patent literatures 1 and 2). In such a clutch, the state of the pawl members is changed between a protrudable state and a restricted protrusion state by switching a rotational position of the selector plate, and thereby it is possible to select either a lock mode where torque transmission between the fixed plate and the rotational plate is allowed only at the time of a predetermined one rotational direction; or a free mode where the torque transmission between the plates is blocked at the time of both rotational directions.

CITATION LIST

Patent Literature

Patent literature #1: JP2008-14333A.
Patent literature #2: JP2002-514292A.

SUMMARY OF INVENTION

Technical Problem

In a case where the mode of the selectable one-way clutch is switched from the lock mode to the free mode, an operational condition of the selector plate is changed depending on a state of torque acting on the rotational plate. That is, in a case where the mode is switched from the lock mode to the free mode in a state that a positive torque is acting on the rotational plate in a positive rotational direction where the engagement between the pawl member and the recess is strengthened, it is necessary to make the selector plate rotate with torque which is capable of forcibly releasing the engagement between the pawl member and the recess. Due to this, a load of driving the rotation of the selector plate is big, and some parts become worn easily due to the forcible release of the engagement.

There is a method for switching the mode of the selectable one-way clutch from the lock mode to the free mode, such as the following. A negative torque is made to act on the rotational plate in a negative rotational direction where the engagement between the pawl member and the recess is weakened to rotate the rotational plate in the negative rotational plate, and after it is determined that a rotational speed with respect to the negative rotational direction of the rotational plate has reached a predetermined threshold value, the selector plate is made to rotate, and thereby the mode is switched from the lock mode to the free mode. In this method, since an overrun state that the rotational plate is rotating in the negative rotational direction is confirmed, it is possible to reliably drive the rotation of the selector palate with a few loads. However, in this method, since the selector plate is rotatively driven after the process for making the negative torque act on the rotational plate and determining that the rotational speed has reached the threshold value, due to time spending for this process, it takes long time to complete the switching from the lock mode to the free mode.

Based on the above problem, the present invention aims to provide a clutch system capable of reducing time needed for completing the switching from the lock mode to the free mode.

Solution to Problem

A clutch system as one aspect of the present invention is A clutch system comprising: a fixed plate being fixed so as to restrict rotation; a rotational plate where at least one recess is formed, each of the at least one recess opening at a surface of the rotational plate, the surface facing the fixed plate; at least one pawl member, each of the at least one pawl member being provided to the fixed plate protrudably toward the rotational plate from the fixed plate, and in a case of protruding from the fixed plate, engaging with the recess formed in the rotational plate only when the rotational plate is rotating in a predetermined rotational direction; a selector plate which is disposed between the fixed plate and the rotational plate, and has at least one aperture, each of the at least one aperture being formed to let the pawl member through, the selector plate being capable of rotating relatively to the fixed plate between a lock position where the pawl member is allowed to protrude from the fixed plate by passing through the aperture and a release position where the pawl member is restricted so as not to protrude from the fixed plate by contacting with a non-formation portion where no aperture is formed; a drive device which rotatively drives the selector plate; and a computer functioning, by executing a computer program, as a control device, the control device being configured so as to rotate the selector plate from the lock position to the release position by operating the drive device so that an operational mode switches between a lock mode where the selector plate is located at the lock position and a free mode where the selector plate is located at the release position, and also configured so as to control torque acting on the rotational plate, wherein the control device is further configured so as to execute, in a case of switching the operational mode from the lock mode to the free mode, an early mode switching control where, while making the selector plate go into a waiting state that the pawl member protruding from the fixed plate abuts against the non-formation portion, the control device makes a negative torque act on the rotational plate in a negative rotational direction opposite to the predetermined rotational direction, and the control device controls the negative torque to rotate the selector plate of the waiting state up to the release position.

According to this clutch system, in a case of switching the operational mode from the lock mode to the free mode, the early mode switching control is executed. Therefore, it is possible to promptly switch the mode from the lock mode to the free mode. In the early mode switching control, while the selector plate is made to go into the waiting state that the pawl member is abutting against the non-formation portion of the selector plate, the negative torque is made to act on the rotational plate, and by controlling the negative torque, the selector plate of the waiting state is made to rotate up to the release position. Therefore, in comparison with a case where the selector plate is rotatively driven after the overrun state that the rotational plate rotates in the negative rotational direction is confirmed, because of omitting the process for confirming the overrun state, it is possible to realize a prompt switching to the free mode.

As one embodiment of the clutch system of the present invention, the drive device may comprise: a biasing device which produces torque which biases the selector plate in a direction heading to the release position; and an actuator which produces a drive power for resisting the torque produced by the biasing device to rotate the selector plate toward the lock position, and the control device may be configured to, when executing the early mode switching control, rotate the selector plate so that the selector plate goes into the waiting state, by lowering the drive power of the actuator. According to this embodiment, only by setting the torque produced by the biasing device as appropriate and lowering the drive power of the actuator, it is possible to make the selector plate go into the waiting state. Accordingly, since it is unnecessary to delicately control the drive power of the actuator, the control could be simple. The lowering the drive power of the actuator includes lowering the drive power up to zero.

There is no particular restriction with respect to an object to which the clutch system of the present invention is applied. The clutch system of the present invention may be applied to various kinds of mechanical apparatuses where torque transmission is executed. For example, as one embodiment of the clutch system of the present invention, the clutch system may be applied to a hybrid vehicle, the hybrid vehicle comprising: an engine; a motor generator; an output portion which outputs torque to a drive wheel; and a differential mechanism which has at least three rotational elements which are capable of rotating differentially to each other are provided, and three of the at least three rotational elements being connected to the engine, the motor generator, and the output portion respectively, wherein the fixed plate may be fixed to a predetermined fixed element of the hybrid vehicle, the rotational plate may be provided to the differential mechanism so as to receive a reaction torque caused by an engine torque of the engine, and the control device may be configured to control the torque acting on the rotational plate by operating the motor generator. According to this embodiment, it is possible to switch the traveling mode of the hybrid vehicle by switching the operational mode of the clutch system.

In the above embodiment where the clutch system is applied to the hybrid vehicle, the control device may be configured to be capable of executing a normal mode switching control where the control device rotates the rotational plate in the negative rotational direction by making the negative torque act on the rotational plate in the negative rotational direction, and, after a rotational speed of the rotational plate with respect to the negative rotational direction reaches a predetermined criterion, the control device rotates the selector plate from the lock position to the release position by operating the drive source, and also may be configured so as to execute selectively either the early mode switching control or the normal mode switching control in a case of switching the operational mode from the lock mode to the free mode. In this case, when switching the traveling mode of the hybrid vehicle, for example, it is possible to select the early mode switching control in a case where it is necessary to promptly switch the operational mode to the free mode. Otherwise, it is possible to select the normal mode switching control. Therefore, it is possible to select a mode switching control to be executed, appropriately to a traveling state of the hybrid vehicle and an operating state of the engine. Concretely, it is possible to select one to be executed from the mode switching controls by the following embodiment.

The control device may be configured to execute the early mode switching control in a case where a target engine speed of the engine after switching to the free mode is bigger than a current engine speed, and to execute the normal mode switching control in a case where the target engine speed is smaller than the current engine speed. In a case of the early mode switching control, there is a characteristic feature such that the engine speed after the switching to the free mode is equal to or rises from the engine speed shortly before the switching. On the other hand, in a case of the normal mode switching control, since the switching to the free mode from the lock mode completes after the rotational plate is made to rotate in the negative rotational direction, there is a characteristic feature that the engine speed after the switching to the free mode gets lower than the engine speed shortly before the switching. Accordingly, in a case where the target engine speed after the switching is smaller than the current engine speed, the normal mode switching control having the characteristic feature that the engine speed rises after the switching is never executed. Therefore, it is possible to prevent the engine speed from rising unnecessarily. Accordingly, it is possible to prevent a driver from feeling strange because of the unnecessary rise of engine speed.

Further, the control device may be configured to set in the lock mode, a part protection request in response to a necessity of protecting the drive device or the motor generator, and to execute the early mode switching control in a case where the part protection request has been set, while executing the normal mode switching control in a case where no part protection request has been set. In a case where the part protection request is set in response to the necessity for protecting the drive device or the motor generator, the operational mode should be promptly switched from the lock mode to the free mode in order to protect the drive device or the motor generator. In this embodiment, in a case where the part protection request has been set, the early mode switching control is executed, and in a case where no part protection request has been set, the normal mode switching control is executed. Thereby, it is possible to realize a prompt switching in response to the part protection request.

Furthermore, the control device may be configured to set in the lock mode, a trouble determination request in response to an occurrence of a trouble of the drive device or the motor generator, and to execute the early mode switching control in a case where the trouble determination request has been set, while executing the normal mode switching control in a case where no trouble determination request has been set. In a case where a trouble occurs in the drive device or the motor generator, as with the part protection request, the lock mode should be promptly switched to the free mode. In this embodiment, in a case where the trouble determination request has been set, the early mode switching control is executed, and in a case where no trouble determination request has been set, the normal mode switching control is executed. Accordingly, it is possible to realize a prompt switching in response to the trouble determination request.

There is no particular restriction with respect to the structure of a differential mechanism provided to a hybrid vehicle, as long as the differential mechanism has a plurality of rotational elements which are connected to the engine, the motor generator, and the output portion respectively. For example, the differential mechanism may have four rotational elements as the at least three rotational elements, wherein the motor generator may be connected to a first rotational element of the four rotational elements, the rotational plate may be connected to a second rotational element of the four rotational elements, the engine may be connected to a third rotational element of the four rotational elements, and the output portion may be connected to a forth rotational element of the four rotational elements, wherein the differential mechanism may be configured so that, when the four rotational elements are disposed on a velocity diagram, the first rotational element, the second rotational element, the third rotational element, and the fourth rotational element are arranged in this order.

Further, the differential mechanism may have three rotational elements as the at least three rotational elements, wherein the motor generator and the rotational plate may be connected to a first rotational element of the three rotational elements, the engine may be connected to a second rotational element of the three rotational elements, and the output portion may be connected to a third rotational element of the three rotational elements, wherein the differential mechanism may be configured so that, when the three rotational elements are disposed on a velocity diagram, the first rotational element, the second rotational element, and the third rotational element are arranged in this order.

In both of the above embodiments, the rotational element connected to the engine and the rotational element connected to the rotational plate lie next to each other on the velocity diagram. Accordingly, in a case the engine outputs the engine torque and also in the lock mode, the rotational plate receives the reaction torque caused by the engine torque. The rotational element connected to the output portion and the rotational element connected to the engine lie next to each other on the opposite side of the rotational element connected to the rotational plate on the velocity diagram. Therefore, by operating the clutch system to the lock mode to inhibit the rotational plate to rotate in the predetermined direction, the transmission ratio of the output portion with respect to the engine speed goes into a fixed state.

As mentioned above, according to the clutch system of the present invention, in a case where the clutch system is switched from the lock mode to the free mode, the early mode switching control is executed. Therefore, it is possible to promptly switch from the lock mode to the free mode.

DESCRIPTION OF EMBODIMENTS

1. First Embodiment

Figure 1:
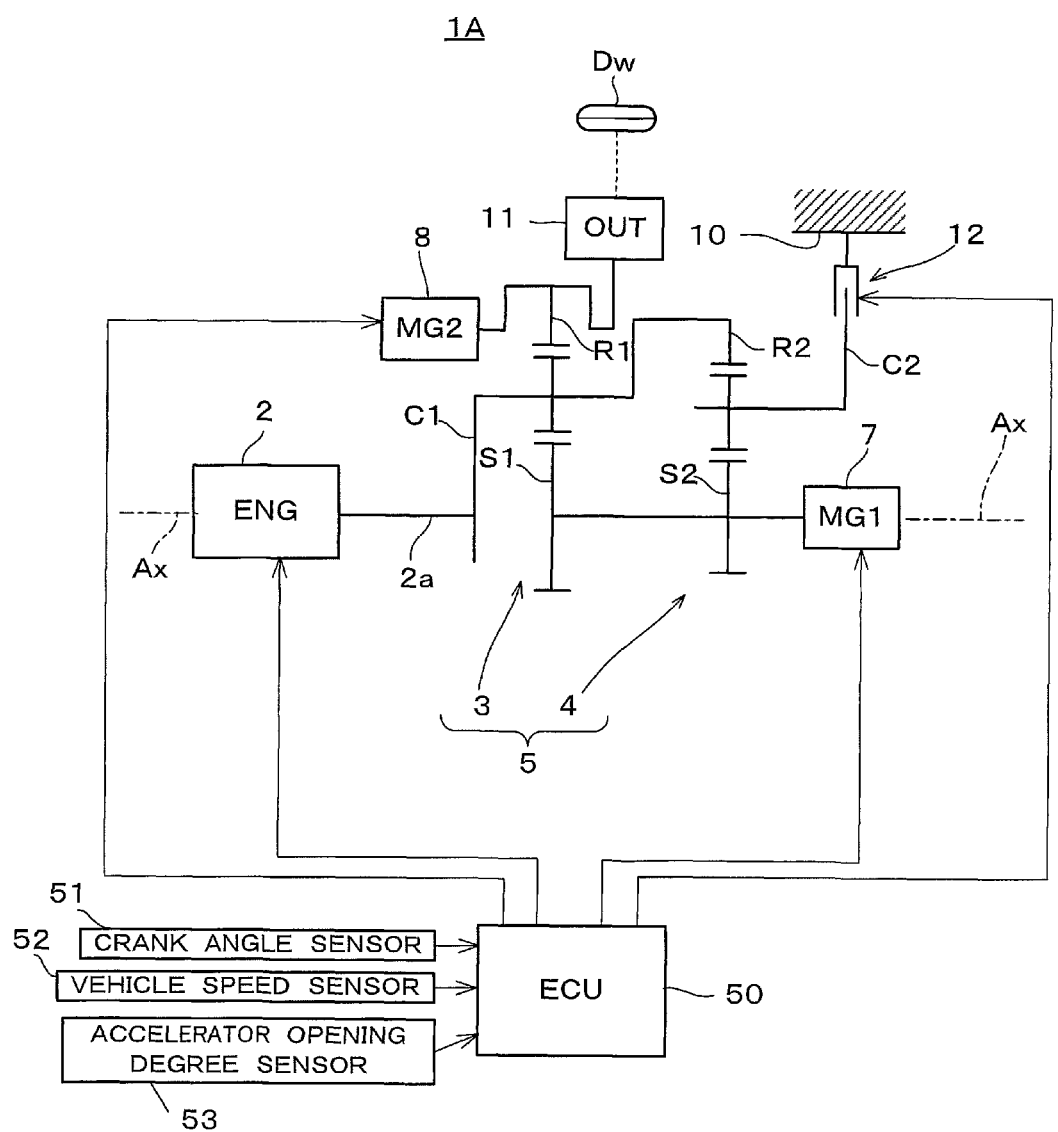
FIG. 1 is a diagram schematically showing a configuration of a hybrid vehicle where a clutch system according to a first embodiment of the present invention is installed.

As shown in FIG. 1, a vehicle 1A is configured as a hybrid vehicle where a clutch system according to a first embodiment of the present invention is mounted. The vehicle 1A comprises: a spark-ignition internal combustion engine 2 as an engine; a power split mechanism 5 as a differential mechanism; and two motor generators 7 and 8. The power split mechanism 5, each of the motor generators 7 and 8 and various elements for power transmission are housed in a case 10.

The power split mechanism 5 is configured by two single-pinion-type planetary gear mechanisms 3 and 4 combined with each other. A sun gear S1 of a first planetary gear mechanism 3 and a sun gear S2 of a second planetary gear mechanism 4 are connected so as to rotate integrally with each other, and a carrier C1 of the first planetary gear mechanism 3 and a ring gear R2 of the second planetary gear mechanism 4 are connected so as to rotate integrally with each other. Due to this, in the power split mechanism 5, four rotational elements are formed, the four rotational elements rotating differentially to each other. A crank shaft 2a of the internal combustion engine 2 is connected to the carrier C1. The first motor generator 7 is connected to the sun gear S2, and the second motor generator 8 is connected to the ring gear R1. To the ring gear R1, an output portion 11 is connected, the output portion 11 including unillustrated gear trains and the like for outputting torque to a drive wheal Dw.

In the first embodiment, the four rotational elements composed of the sun gear S2 (the sun gear S1); a carrier C2; the carrier C1 (the ring gear R2); and the ring gear R1 correspond to the four rotational elements of the present invention. The sun gear S2 (the sun gear S1) corresponds to a first rotational element of the present invention, the carrier C2 corresponds to a second rotational element of the present invention. The carrier C1 (the ring gear R2) corresponds to a third rotational element of the present invention. And, the ring gear R1 corresponds to a fourth rotational element of the present invention. As apparently shown in a velocity diagram in FIG. 7, when these four rotational elements are disposed on the velocity diagram, they are arranged in this order; the sun gear S1 (the sun gear S2) as the first rotational element; the carrier C2 as the second rotational element; the carrier C1 (the ring gear R2) as the third rotational element; and the ring gear R1 as the fourth rotational element.

Figure 2:
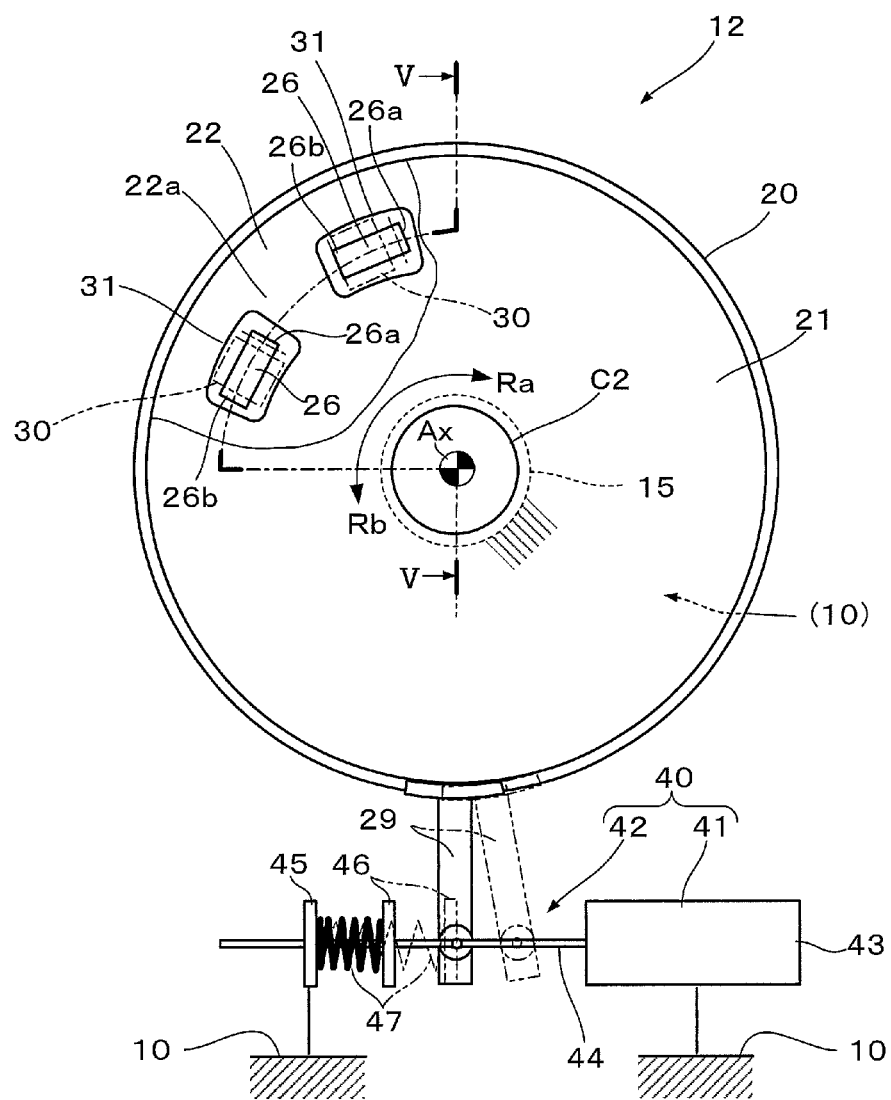
FIG. 2 is a diagram showing a selectable one-way clutch of FIG. 1.

As shown in FIG. 1, in the vehicle 1A, a selectable one-way clutch (hereinafter, referred to as the clutch) 12 is provided as a construction element of the clutch system. The clutch 12 functions as a brake intervening between the carrier C2 of the power split mechanism 5 and the case 10. As shown in FIG. 2, the clutch 12 is configured so as to select its operational mode between a lock mode and a free mode. In the lock mode, the following two states are switchable to each other: one state that in a case where the rotational direction of the carrier C2 is a positive rotational direction Ra as a predetermined one rotational direction, torque transmission from the carrier C2 to the case 10 is allowed and the carrier C2 is fixed; and the other state that in a case where the rotational direction of the carrier C2 is a negative rotational direction Rb opposite to the positive rotational direction Ra, the torque transmission is blocked and the carrier C2 is released. In the free mode, maintained is a state the torque transmission from the carrier C2 to the case 10 is blocked and the carrier C2 is released, regardless of whether the rotational direction of the carrier C2 is the positive rotational direction Ra or the negative rotational direction Rb.

Figure 3:
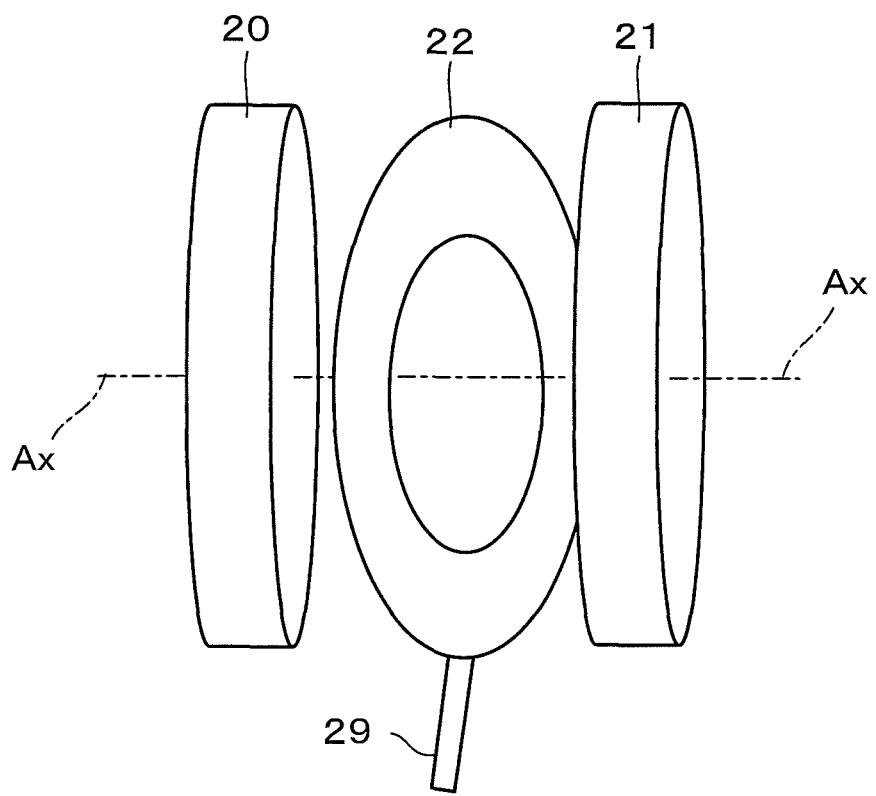
FIG. 3 is a diagram schematically showing structure elements of the selectable one-way clutch.

As shown in FIGS. 2 and 3, the clutch 12 comprises: a fixed plate 20, a rotational plate 21, and a selector plate 22. The fixed plate 20 is provided unrotatatbly around an axial line Ax with respect to a fixed shaft 15 as a fixed element which is fixed to the case 10. The rotational plate 21 is provided to the carrier C2 so that the rotational plate 21 is capable of rotating around the axial line Ax integrally with the carrier C2. The selector plate 22 is disposed between the fixed plate 20 and the rotational plate 21 and is provided rotatably around the axial line Ax.

Figure 4:
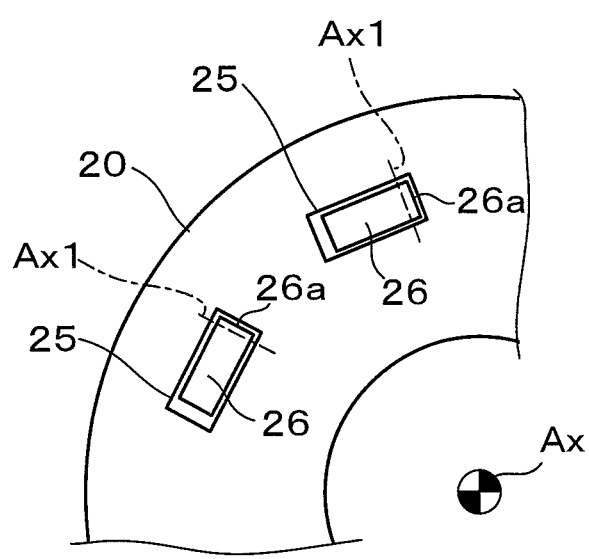
FIG. 4 is a diagram showing a part of a fixed plate.
Figure 5:
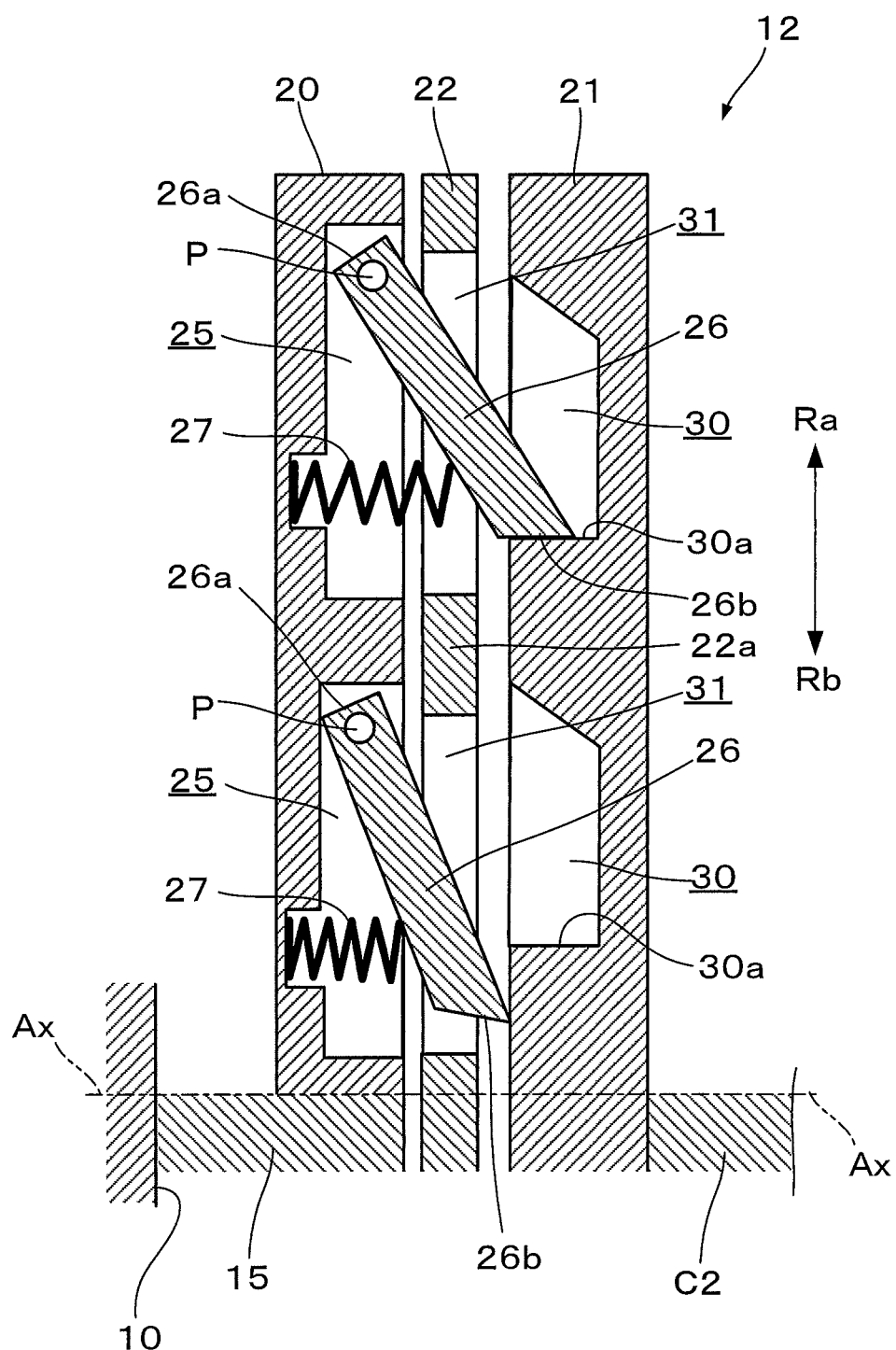
FIG. 5 is a sectional view taken along line V-V of FIG. 2 at the time of the lock mode.

As shown in FIGS. 2, 4, and 5, in the fixed plate 20, a plurality of holding pockets 25 each opening at a surface of the fixed plate 20 that faces the rotational plate 21 are formed so as to be arranged in a circumferential direction. For each holding pocket 25, a pawl member 26 to engage with the rotational plate 21 is provided one by one. Each pawl member 26 is provided to the fixed plate 20 via a spindle P in such a manner that a base end 26a of the pawl member 26 is capable of rotating around an axial line Ax1 extending in a radial direction of the fixed plate 20, and each pawl member 26 is biased in a protruding direction heading to the rotational plate 21 by a spring 27. Thereby, each pawl member 26 is capable of going into either one of two operational states: a first state that it is restricted that the pawl member 26 protrudes because the pawl member 26 backs into the fixed plate 20 side to be housed in the holding pocket 25; and a second state that the pawl member 26 protrudes toward the rotational plate 21 from the fixed plate 20. That is, each pawl member 26 is provided to the fixed plate 20 in such a manner that the pawl member 26 is capable of protruding.

As shown in FIGS. 2 and 5, on the rotational plate 21, a plurality of recesses 30 opening at a surface of the rotational plate 21 that faces the fixed plate 20 are formed so as to be arranged in a circumferential direction. Each recess 30 has a wall portion 30a where a front end 26b of the pawl member 26 abuts at a time when a protruding pawl member 26 engages with the recess 30. Not illustrated, but the number of recesses 30 is more than the number of pawl members 26, and the phase of each recess 30 and the phase of each pawl member 26 are different from each other (see FIG. 5). Accordingly, a part of the plurality of pawl members 26 which are protruding engage with a part of the plurality of recesses 30.

In the selector plate 22, a plurality of apertures 31 are formed in the same phase as the pawl members 26 respectively. The plurality of apertures 31 are arranged in a circumferential direction, and each of the plurality of apertures 31 can let a part of the protruding pawl member 26 through. It is possible to switch a rotational position of the selector plate 22 between a lock position shown in FIG. 5 and a release position shown in FIG. 6. In the lock position, the pawl member 26 can be allowed to pass through the aperture 31 of the selector plate 22 and to engage with the recess 30 of the rotational plate 21. In the release position, the front end 26b of the pawl member 26 abuts against a non-formation portion 22a of the selector plate 22 where no aperture 31 is formed, and thereby, it is restricted that the pawl member 26 protrudes. Thereby, in the clutch 12, the lock mode and release mode mentioned above are realized selectively.

As shown in FIG. 2, the selector plate 22 is provided with an operation arm 29 extending in a radial direction. The operation arm 29 is driven by a drive device 40 and thereby the rotational position of the selector plate 22 is switched. The drive device 40 comprises an actuator 41 which produces drive power for making the selector plate 22 rotate toward the lock position; and a transmission mechanism 42 which transmits operation of the actuator 41 to the operation arm 29 of the selector plate 22. The actuator 41 includes a main body 43 fixed to the case 10; and a drive rod 44 which is capable of heading from and backing to the main body 43 and also link-connected with the operation arm 29. The transmission mechanism 42 is fixed to the case 10, and includes a guide member 45 which guides the drive rod 44 of the actuator 41; a spring sheet 46 fixed to the drive rod 44; and a return spring 47 mounted between the guide member 45 and the spring sheet 46 in a compressed state.

The state shown by a solid lines in FIG. 2 is a state that the rotational position of the selector plate 22 has been switched to the lock position, by making the actuator 41 of the drive device 40 work so that the drive rod 44 protrudes from the main body 43 while resisting an elastic force of the return spring 47. The clutch 12 of this state goes into the lock mode mentioned above. On the other hand, in a case where, from the state shown by the solid lines in FIG. 2, the actuator 41 of the drive device 40 is switched to a non-worked state, the drive rod 44 backs to the main body 43 side by the elastic force of the return spring 47 and thereby the operation arm 29 moves to a position shown by chain double-dashed lines. Due to this, the rotational position of the selector plate 22 is switched to the release position. Thereby, the clutch 12 goes into the release mode.

In a case of the lock mode shown in FIG. 5, at a time when the rotational direction of the rotational plate 21 is the positive rotational direction Ra, the front end 26b of the pawl member 26 abuts against the wall portion 30a of the recess 30. Accordingly, the pawl member 26 engages with the recess 30 of the rotational plate 21, so that the fixed plate 20 and the rotational plate 21 are connected to each other. Thereby, the torque transmission between the plates is allowed and the carrier C2 is fixed to the case 10. On the other hand, at a time when the rotational direction of the rotational plate 21 is the negative rotational direction Rb, since the pawl members 26 are inclined in the negative rotational direction Rb, even if the pawl member 26 reaches the recess 30 of the rotational plate 21, the pawl member 26 is just returned toward the fixed plate 20. Therefore, the pawl member 26 does not engage with the recess 30. Accordingly, in a case where the clutch 12 is in the lock mode, at a time when the rotational direction of the rotational plate 21 is the negative rotational direction Rb, the torque transmission from the rotational plate 21 to the fixed plate 20 is blocked, and the rotational plate 21 is released.

Figure 6:
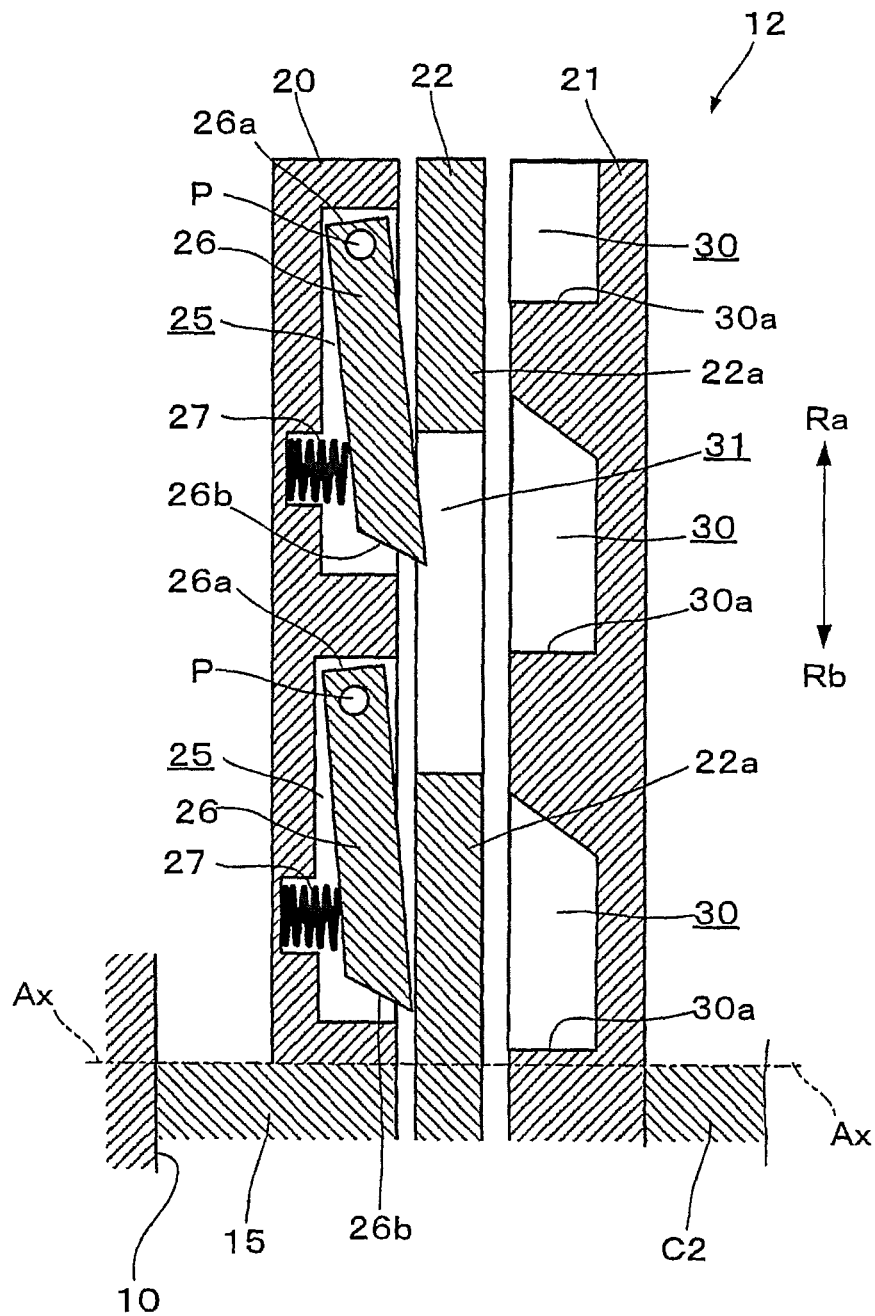
FIG. 6 is a sectional view taken along line V-V of FIG. 2 at the time of the free mode.

On the other hand, in a case of the release mode shown in FIG. 6, the protrusion of each pawl member 26 is restricted by the selector plate 22 and thereby the pawl member 26 is kept in a state that the pawl member 26 is housed in the fixed plate 20 side. Due to this, each pawl member 26 does not reach the recess 30. Accordingly, regardless of whether the rotational direction of the rotational plate 21 is the positive rotational direction Ra or the negative rotational direction Rb, the torque transmission from the rotational plate 21 to fixed plate 20 is blocked, and the rotational plate 21 is released. The free mode shown in FIG. 6 is kept by the elastic force of the return spring 47 mentioned above.

The vehicle 1A switches the drive mode between a fixed shift mode and a continuously variable shift mode by switching the operational mode of the clutch 12 between the lock mode and the free mode. At the time of the fixed shift mode, the clutch is controlled to be in the lock mode, and also the first motor generator 7 is controlled so as to be in a shut-down state where the first motor generator 7 is controlled to function as neither an electric motor nor a power generator, and is capable of idling. On the other hand, at the time of the continuously variable shift mode, the clutch 12 is controlled so as to be in the free mode, and the motor torque and motor rotational speed of the first motor generator 7 are controlled so that the internal combustion engine 2 is operated on a highly-efficient operating point.

Figure 7:
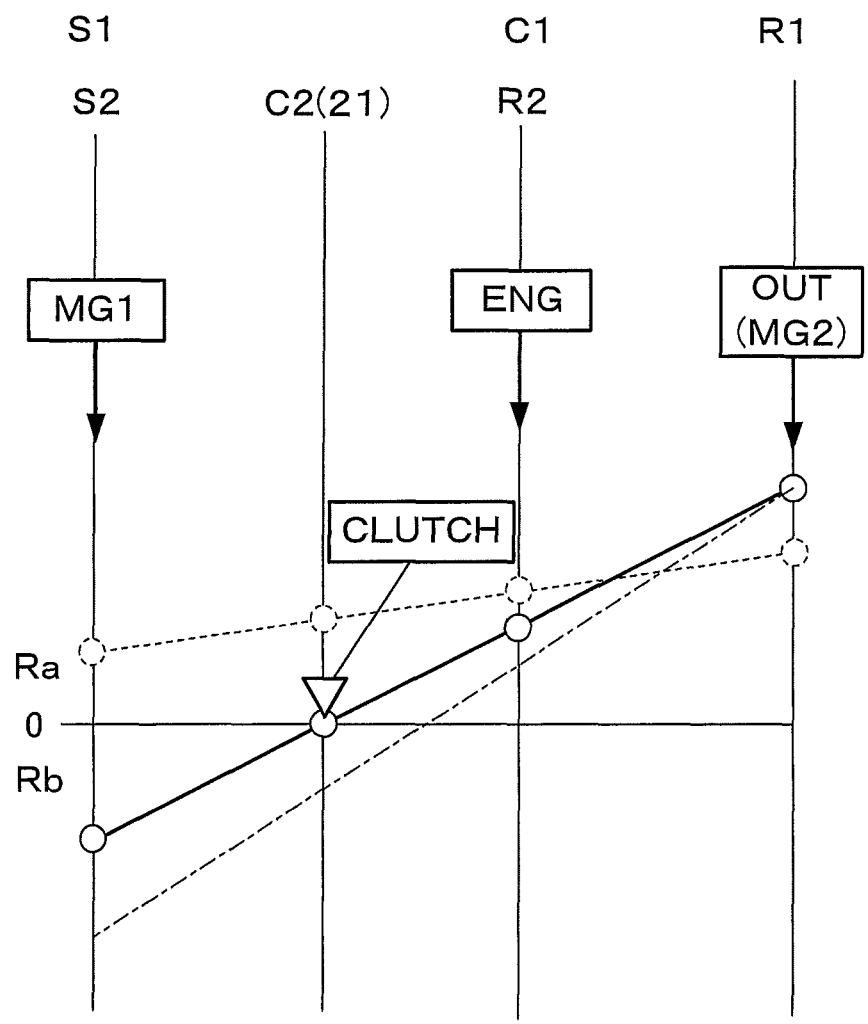
FIG. 7 is a velocity diagram of a power split mechanism according to the first embodiment.

As shown by a solid line in FIG. 7, in a case where the clutch 12 is in the lock mode, the rotational plate 21 receiving reaction torque caused by the internal combustion engine 2 is inhibited to rotate in the positive rotational direction Ra. Due to this, as long as a positive-directional engine torque is outputted from the internal combustion engine 2, the rotational speed of the rotational plate 21 is zero in a state that torque is acting on the rotational plate 21 in the positive rotational direction Ra. Therefore, as apparently shown in FIG. 7, with respect to the engine speed of the internal combustion engine 2, the transmission ratio of the output portion 11 is determined uniquely by the gear ratio of the power spilt mechanism 5. Thereby, the transmission ratio goes into a fixed state. On the other hand, as shown by a broken line in FIG. 7, in a case where the clutch 12 is in the free mode, since the rotational plate 21 is released with respect to both of the positive rotational direction Ra and the negative rotational direction Rb, it is possible to change continuously the transmission ratio of the output portion 11 with respect to the engine speed by controlling the motor torque and motor rotational speed of the first motor generator 7.

As shown in FIG. 1, an electronic control unit (ECU) 50 controls the clutch 12 and thereby the drive mode of the vehicle 1A is switched. The ECU is configured as a computer for controlling various portions of the vehicle 1A and functions as a control device of the present invention. To the ECU 50, output signals from various sensors are inputted, the output signals being used for control of the vehicle 1A. For example, output signals from a crank angle sensor 51, a vehicle speed sensor 52, an accelerator opening degree sensor 53 and the like are inputted to the ECU 50. The crank angle sensor 51 outputs a signal according to a crank angle of the internal combustion engine 2. The vehicle speed sensor 52 outputs a signal according to a vehicle speed of the vehicle 1A. The accelerator opening degree sensor 53 outputs a signal according to an amount of depression to an accelerator pedal unillustrated.

The ECU 50 refers to the output signals from the vehicle speed sensor 52 and the accelerator opening degree sensor 53 to calculate a current required power to the vehicle 1A, and controls the vehicle 1A while switching the drive mode to a drive mode appropriate to the current required power. For example, in a low speed region where thermal efficiency of the internal combustion engine 2 deteriorates, the ECU 50 stops operations of the internal combustion engine 2 and switches the drive mode to an electric vehicle mode where the first motor generator 7 and the second motor generator 8 are used as power sources. Further, the ECU 50 switches the drive mode to a hybrid mode where the internal combustion engine 2 and the second motor generator 8 are used as the power sources, in a case, for example, where the thermal efficiency lowers if only the engine power is used for the required power.

It is predetermined whether the fixed shift mode or the continuously variable shift mode should be selected at the time of the hybrid mode, depending on various conditions: a traveling state of the vehicle 1A; an operational state of the internal combustion engine 2; temperature of the first motor generator 7, a remaining charge amount rate of a battery unillustrated, and the like. For example, in a case where a predetermined conditions are satisfied while the fixed shift mode is going on, for example, in a case where a better system efficiency of the vehicle 1A is expected if the drive mode is switched to the continuously variable shift mode in comparison with a case where the fixed shift mode is continued, the ECU 50 sets a switching request and switches the clutch 12 from the free mode to the lock mode. Thereby, the drive mode of the vehicle 1A is switched from the fixed shift mode to the continuously variable shift mode.

The present embodiment has features in mode switching controls which are executed when the clutch 12 is switched from the lock mode to the free mode. The ECU 50 manages a normal mode switching control and an early mode switching control for as to execute either of which is executed depending on the situation.

(Normal Mode Switching Control)

Figure 8:
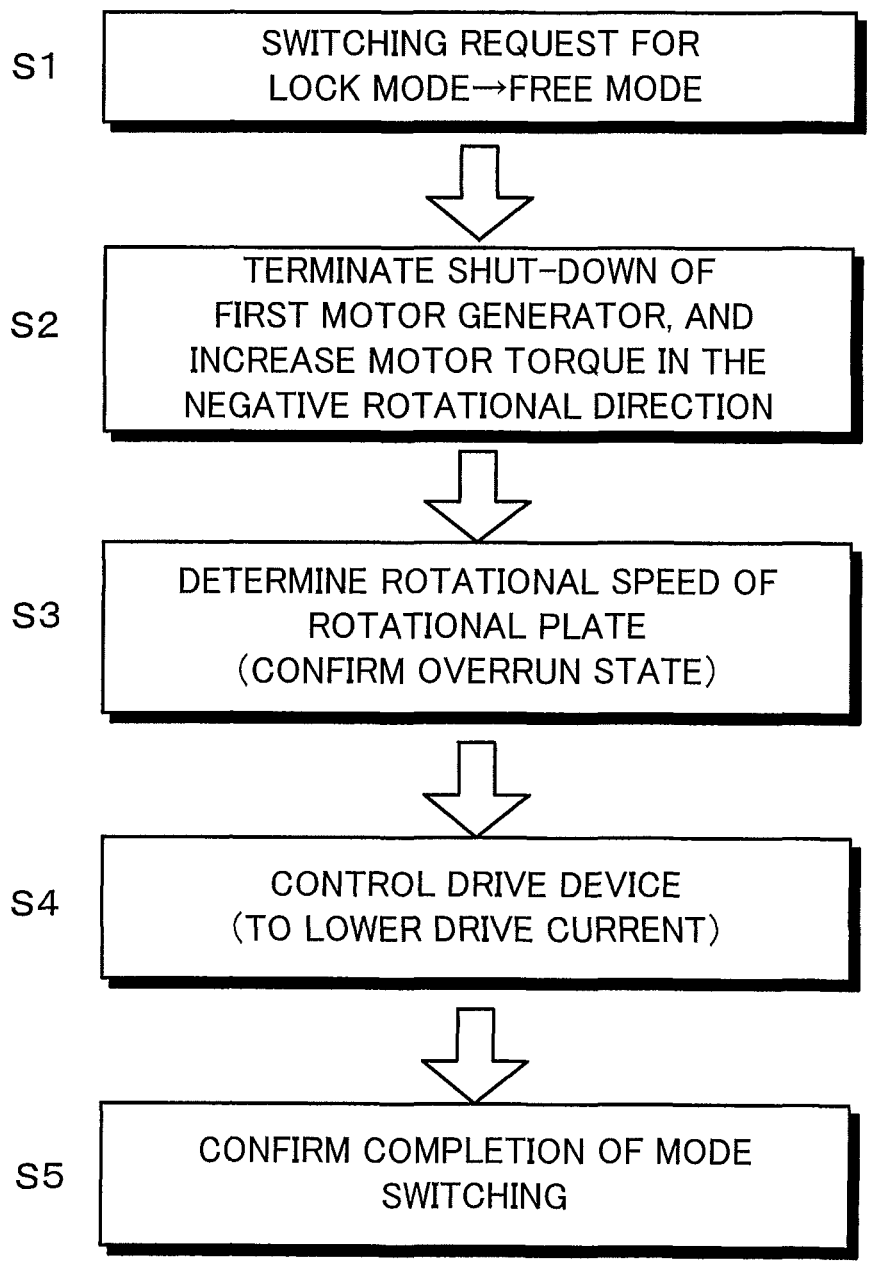
FIG. 8 is a flow chart showing one example of procedure of the normal mode switching control.
Figure 9:
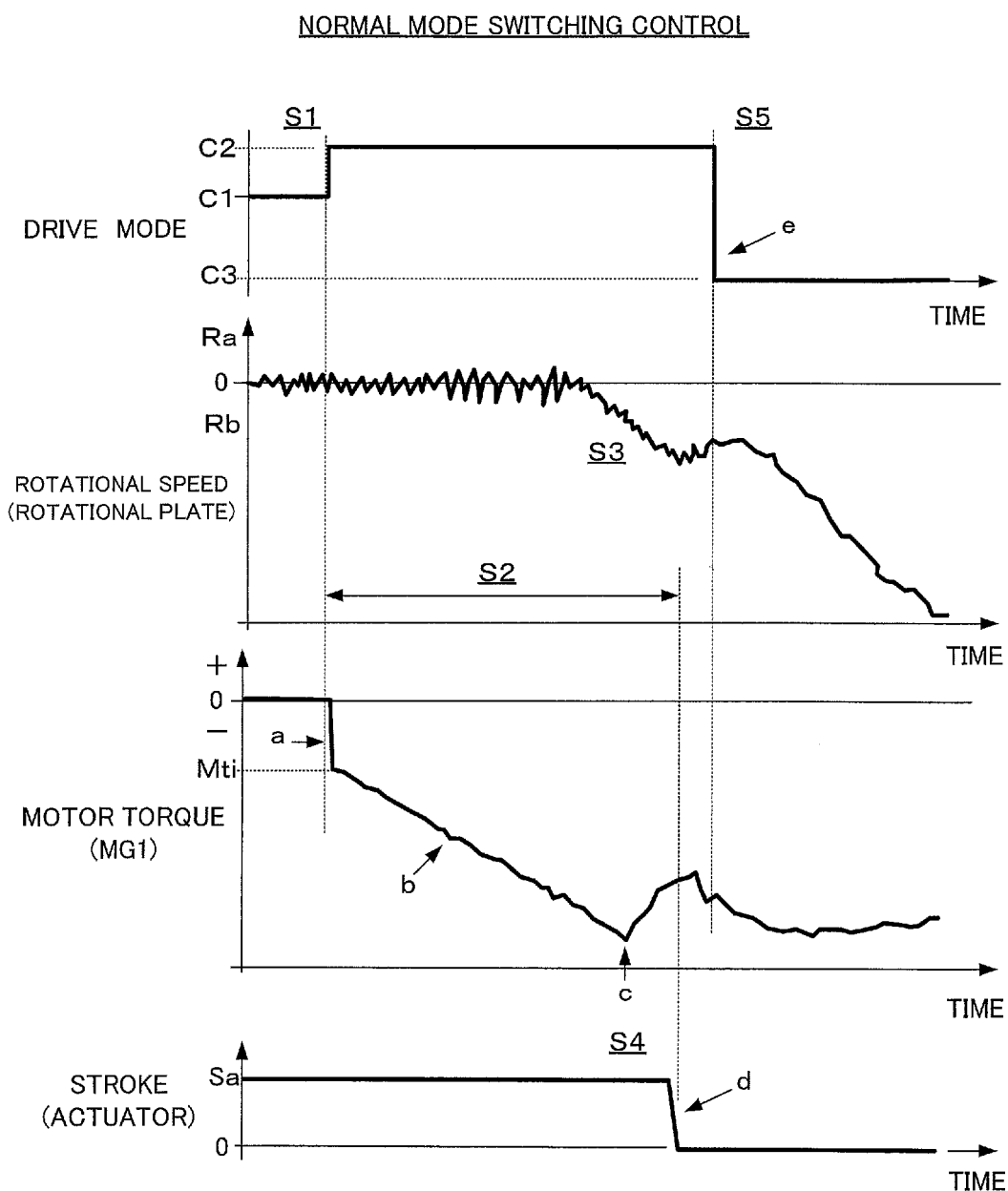
FIG. 9 is a timing chart showing one example of temporal change of each parameter at the time of execution of the normal mode switching control.
Figure 10:
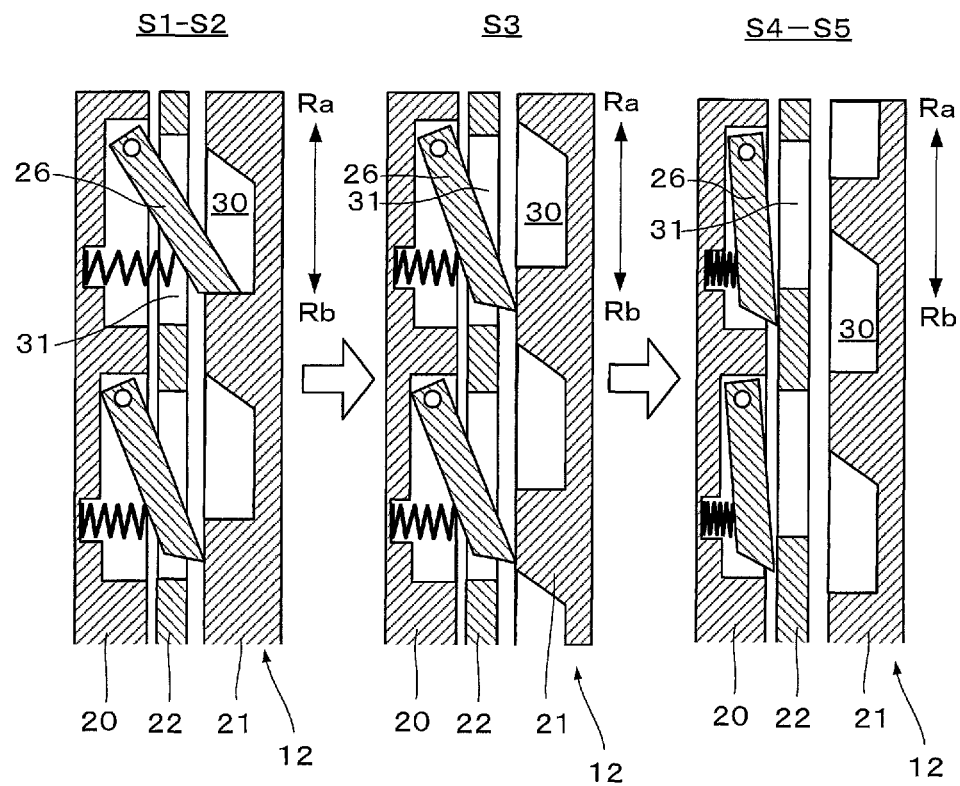
FIG. 10 is an explanatory diagram showing change of the state of the selectable one-way clutch at the time of execution of the normal mode switching control.

First, the normal mode switching control will be explained in reference to FIGS. 8 to 10. As shown in FIGS. 8 and 9, in a case where the ECU 50 determines when the fixed shift mode is ongoing that the drive mode should be switched to the continuously variable shift mode, the ECU 50 sets the switching request for switching the clutch 12 from the lock mode to the free mode at step S1. By setting this switching request, the control mode of the vehicle 1A is, as shown in FIG. 9, moved from a fixed shift mode C1 to a transient mode C2. In this step, as shown at S1-S2 in FIG. 10, the clutch 12 is in such a state that the rotational plate 21 is inhibited to rotate in the positive rotational direction Ra and the engagement between the pawl members 26 and the recesses 30 is maintained.

At next step S2, the ECU 50 terminates the shut-down state of the first motor generator 7, which has been controlled to be in the shut-down state during the ongoing fixed shift mode. That is, the first motor generator 7 is made to function as an electric motor or a power generator. The ECU 50, as shown by an arrow a in FIG. 9, increases motor torque of the first motor generator 7 in the negative rotational direction Rb. Thereby, the clutch 12 goes into a state that the negative torque acts on the rotational plate 21 of the clutch 12 in the negative rotational direction Rb. An initial value Mti of the motor torque is calculated based on the minimum value of the current engine torque estimate. Subsequently, the ECU 50, as shown by an arrow b in FIG. 9, gradually increases the motor torque at a slow increase rate from the initial value Mti. While increasing the motor torque in the negative rotational direction Rb, the ECU 50 continues to monitor the rotational speed of the rotational plate 21 (the carrier C2). The motor torque is increased continuously in the negative rotational direction Rb and thereby the rotational plate 21 starts to rotate in the negative rotational direction Rb. That is, as shown at S3 in FIG. 10, the clutch 12 goes into an overrun state where the rotational plate 21 rotates in the negative rotational direction Rb.

At step S3, in order to confirm the overrun state, the ECU 50 determines whether the rotational speed of the rotational plate 21 with respect to the negative rotational direction Rb satisfies a predetermined criterion, for example, whether the rotational speed exceeding a threshold value continues for at least a determination period or not. When determining that the rotational speed of the rotational plate 21 with respect to the negative rotational direction Rb has satisfied the criterion, as shown by an arrow c in FIG. 9, the ECU 50 terminates the increase of the motor torque of the first motor generator and lowers the motor torque.

At step S4, the ECU 50 lowers a drive current of the actuator 41 of the drive device 40. In the present embodiment, the operation for blocking the drive current of the actuator 41 is executed to the drive device 40. Thereby, because of the elastic force of the return spring 47, the selector plate 22 rotates to the release position. That is, as shown by the arrow b in FIG. 9, the stroke of the actuator 41 retunes to zero corresponding to the release position of the selector plate 22 from the maximum value Sa corresponding to the lock position of the selector plate 22.

At step S5, the ECU 50 confirms that the stroke of the actuator 41 has returned to zero by referring to a signal of a stroke sensor unillustrated to confirm completion of switching of the clutch 12 from the lock mode to the free mode. As shown at S4-S5 in FIG. 10, the rotational plate 21 of the clutch 12 becomes capable of rotating in both of the positive rotational direction Ra and the negative rotational direction Rb. The normal mode switching control is executed through the above mentioned procedures of steps S1 to S5. Further, after confirming the completion of the switching, the ECU 50, as shown by an arrow e in FIG. 9, moves the control mode of the vehicle 1A from the transient mode C2 to the continuously variable shift mode C3.

(Eary Mode Switching Control)

Figure 11:
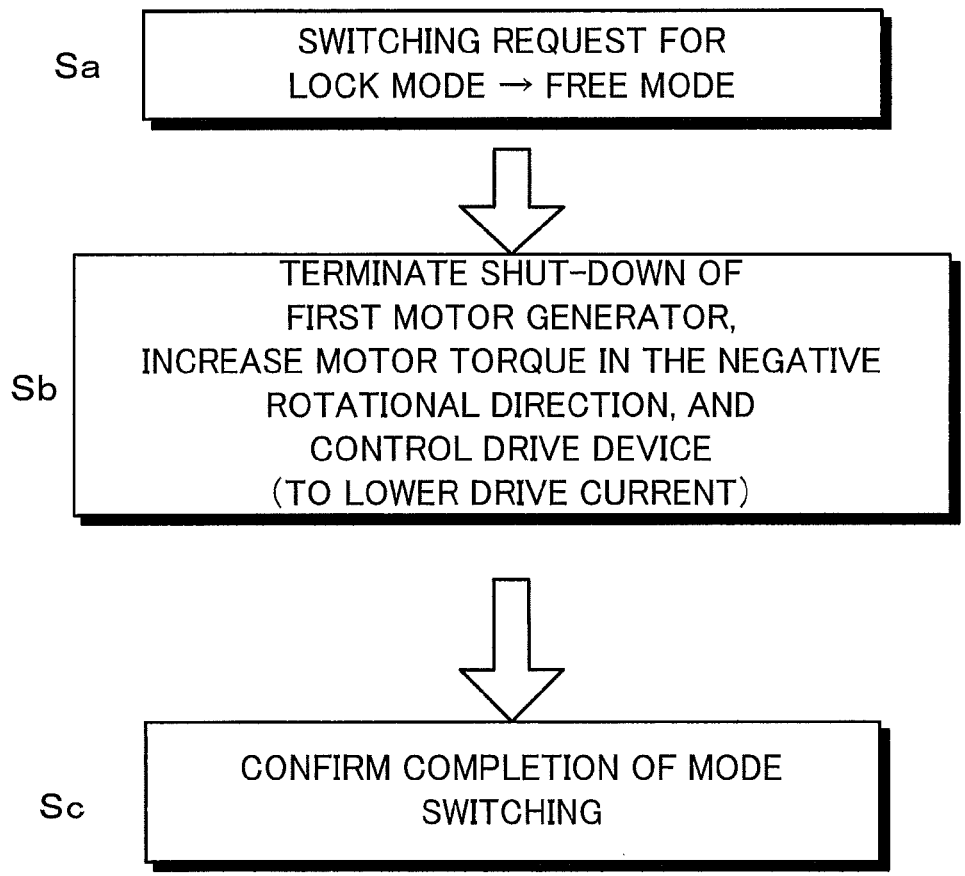
FIG. 11 is a flow chart showing one example of procedure of the early mode switching control.
Figure 12:
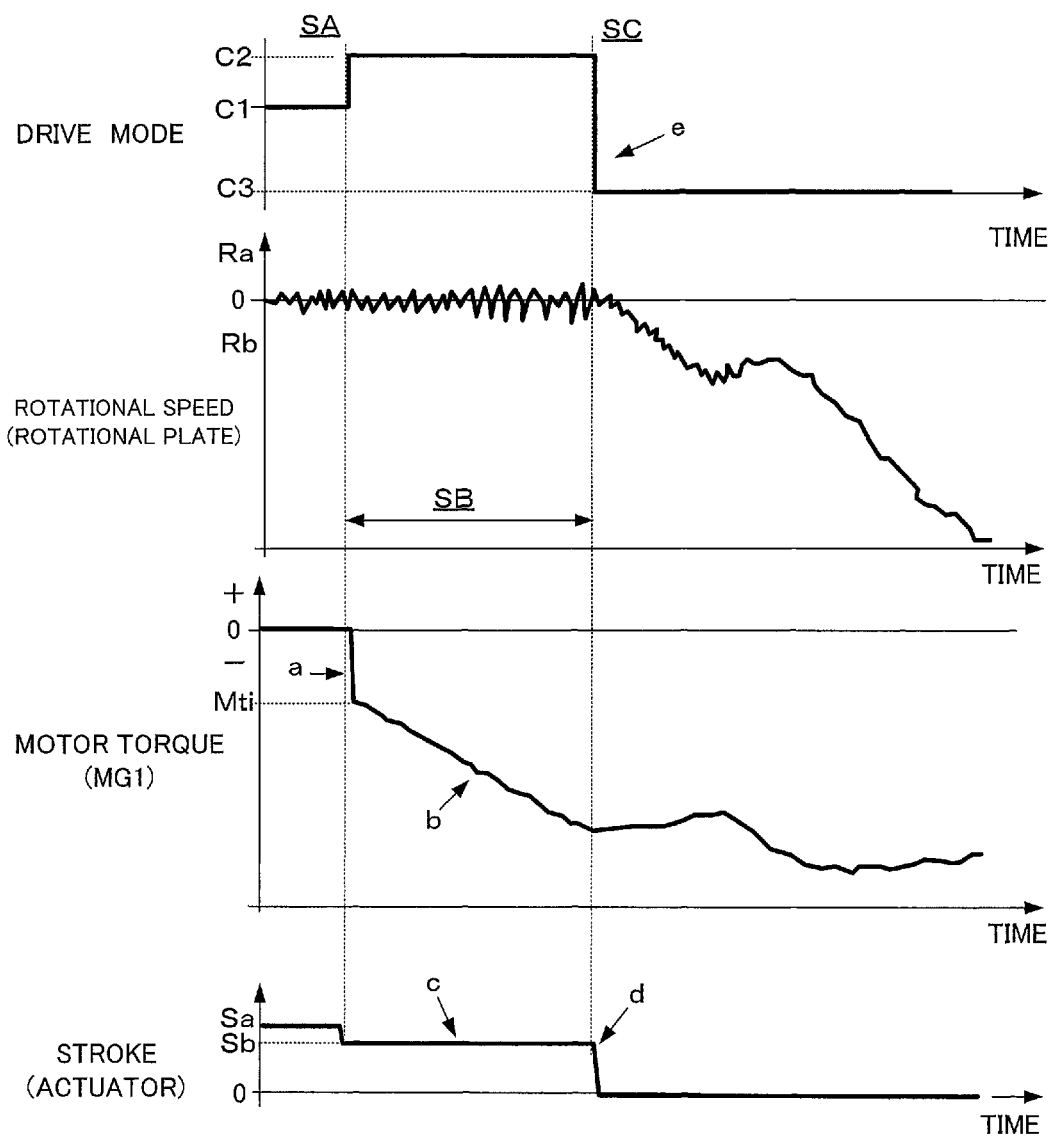
FIG. 12 is a timing chart showing one example of temporal change of each parameter at the time of execution of the early mode switching control.

Next, the early mode switching control will be explained in reference to FIGS. 11 to 13. As shown in FIGS. 11 and 12, in a case where the ECU 50 determines when the fixed shift mode is ongoing that the drive mode should be switched to the continuously variable shift mode, the ECU 50 sets the switching request for switching the clutch 12 from the lock mode to the free mode at step SA. In this step, as shown at SA in FIG. 13, the clutch 12 is in such a state that the rotational plate 21 is inhibited to rotate in the positive rotational direction Ra and the engagement between the pawl members 26 and the recesses 30 is maintained.

At next step SB, the ECU 50 terminates the shut-down state of the first motor generator 7, and makes the first motor generator 7 to function as an electric motor or a power generator. The ECU 50, as shown by an arrow a in FIG. 12, increases motor torque of the first motor generator 7 in the negative rotational direction Rb up to the initial value Mti. Thereby, the clutch 12 goes into a state that the negative torque acts on the rotational plate 21 of the clutch 12 in the negative rotational direction Rb. Coincidentally with this increase of the motor torque, the ECU 50 lowers the drive current of the actuator 41 of the drive device 40. In the present embodiment, the operation for blocking the drive current of the actuator 41 is executed to the drive device 40.

Figure 13:
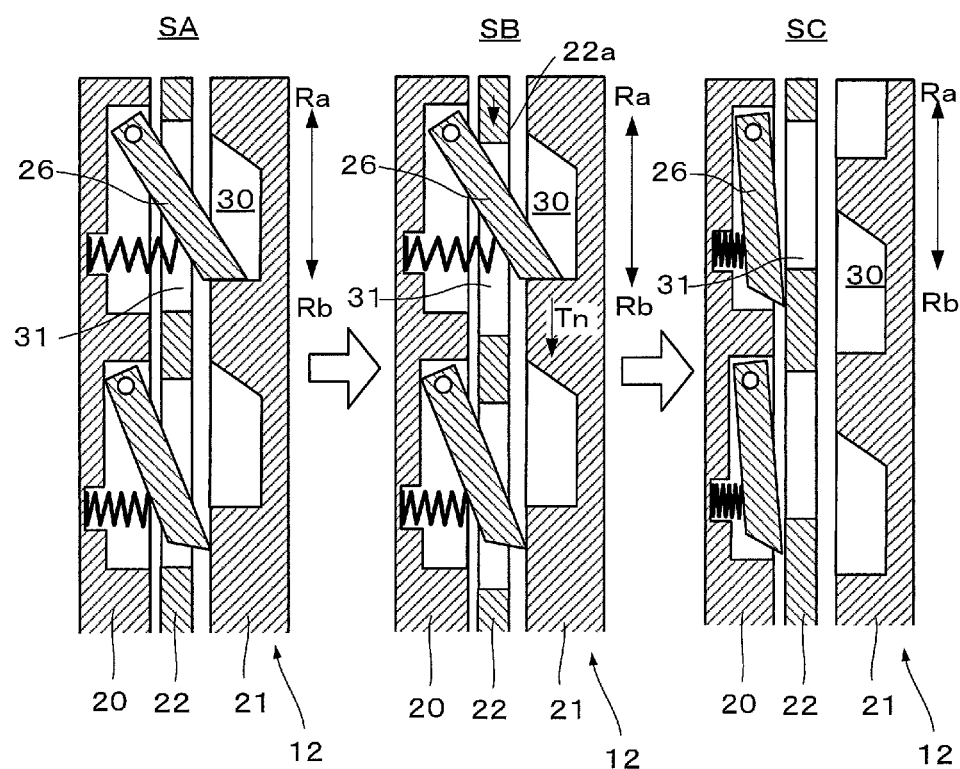
FIG. 13 is an explanatory diagram showing change of the state of the selectable one-way clutch at the time of execution of the early mode switching control.

Thereby, as shown at SB in FIG. 13, in a state that a negative torque Tn is acting on the rotational plate 21, the selector plate 22 rotates in a direction heading to the release position by the elastic force of the return spring 47. The selector plate 22 goes into a waiting state that the pawl members 26 protruding from the fixed plate 20 abut against the non-formation portion 22a of the selector plate 22. The elastic force of the spring 47 is not so big that the engagement between the pawl members 26 and the recesses 30 is forcibly released, even if the motor torque increases up to the initial value Mti. Due to this, the waiting state is maintained until the force for rotating the selector plate 22 with the elastic force of the return spring 47 exceeds the frictional force acting between the pawl member 26 and the recess 30. That is, as shown by an arrow c in FIG. 12, the stroke of the actuator 41 is maintained at a waiting value Sb between the maximum value Sa and zero.

After the motor torque has been increased up to the initial value Mti, while the selector plate 22 is maintained in the waiting state, the ECU 50 controls the first motor generator 7 to gradually increase the motor torque at a gentle increase rate. Thereby, the negative torque Tn (see FIG. 13) acting on the selector plate 22 is controlled to lower the frictional force acting between the pawl member 26 and the recess 30. When the motor torque has increased to such a degree that the force for rotating the selector plate 22 exceeds the frictional force, as shown by an arrow d in FIG. 12, the selector plate 22, which has been in the waiting state, rotates up to the release position. Thereby, the stroke of the actuator 41 returns to zero corresponding to the release position of the selector plate 22 from the waiting value Sb corresponding to the waiting state of the selector plate 22.

At step SC of FIG. 11, the ECU 50 confirms that the stroke of the actuator 41 returns to zero by referring to the signal of the stroke sensor unillustrated, and thereby the ECU 50 confirms the completion of switching the clutch 12 from the lock mode to the free mode. As shown at SC in FIG. 13, the rotational plate 21 of the clutch 12 becomes capable of rotating in both of the positive rotational direction Ra and the negative rotational direction Rb. And then, after confirming the completion of the switching, the ECU 50 moves the control mode of the vehicle 1A from the transient mode to the continuously variable shift mode as shown by an arrow e in FIG. 12.

The early mode switching control is executed by the above procedures of steps SA to SC. In the early mode switching control, it is not necessary to confirm the overrun state that the rotational plate 21 rotates in the negative rotational direction Rb, while it is necessary in the normal mode switching control. Accordingly, in the early mode switching control, as apparently shown in FIGS. 9 and 12, it is possible to reduce a duration time from the lock mode until the completion of switching to the free mode by time necessary for confirming the overrun state, in comparison with the normal mode switching control. Thereby, it is possible to shorten a period of the transient mode C2 of the vehicle 1A. Therefore, it is possible to switch promptly from the fixed shift mode C1 to the continuously shift mode C3.

As understandably shown at the velocity diagram of FIG. 7, in the early mode switching control, the motor torque of the first motor generator 7 is increased in the negative rotational direction Rb, and shortly before the motor torque of the first motor generator 7 balances the engine torque acting on the first motor generator 7, that is, shortly before the rotational plate 21 starts to rotate in the negative rotational direction Rb, it is completed to switch the clutch 12 from the lock mode to the free mode. Due to this, the engine speed after the switching to the free mode is equal to, or rises from the engine speed shortly before the switching. On the other hand, in the normal mode switching control, it is completed to switch the clutch 12 from the lock mode to the free mode after the motor torque of the first motor generator 7 is increased in the negative rotational direction Rb and the rotational plate 21 is rotated in the negative rotational direction Rb. Therefore, as shown by a dot-and-dash line in FIG. 7, the engine speed after the switching to the free mode gets lower than the engine speed shortly before the switching.

In this way, there is a difference between the normal mode switching control and the early mode switching control in a state of engine speed which changes at the time of switching from the lock mode to the free mode. Due to this, the ECU 50 executes either the normal mode switching control or the early mode switching control, depending on a target engine speed after the switching to the free mode, necessity of early completion of the switching to the free mode, and the other circumstances. Hereinafter, one example of procedures for making the ECU 50 determine to execute either one of the mode switching controls will be explained in reference to FIGS. 14 to 16.

Figure 14:
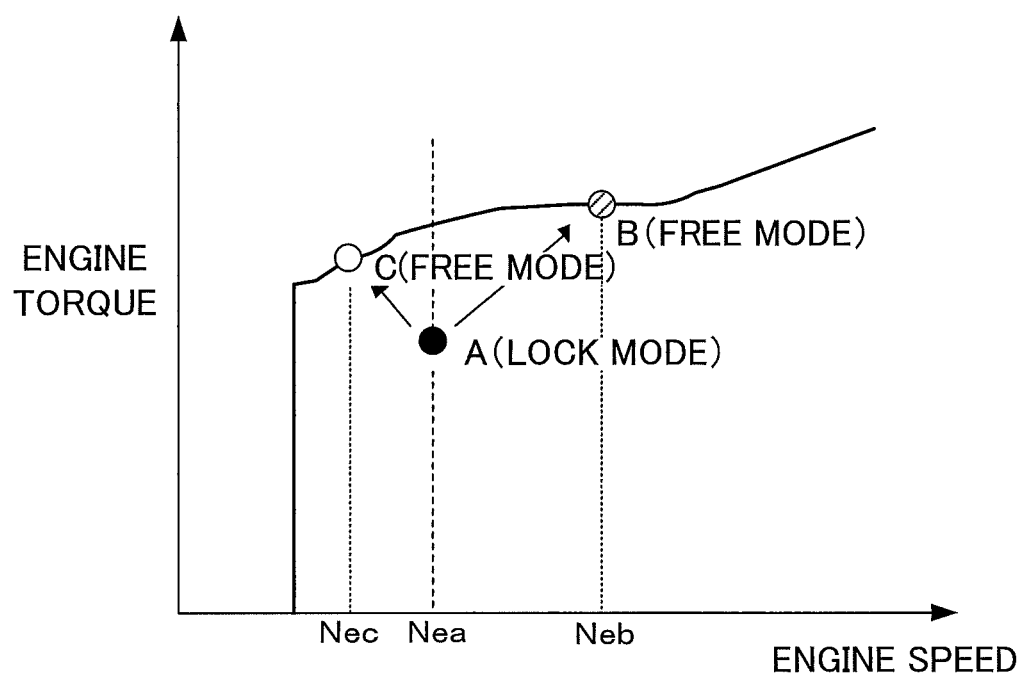
FIG. 14 is a diagram showing a relation between a current operating point and an operating point which should become a target after a switching from the lock mode to the free mode.

As shown in FIG. 14, when the vehicle 1A is being operated in the lock mode, the clutch 12 is switched from the lock mode to the free mode. As mentioned above, the operating point of the internal combustion engine 2 is calculated based on the required power and the like. In a case where the operating point is controlled after the switching to the free mode, so as to change from a current operating point A to either an operating point B or an operating point C as a next operating point, the target engine speed Neb on the operating point B is bigger than the engine speed Nea on the current operating point A and the target engine speed Nec on the operating point C is smaller than the engine speed Nea on the current operating point A. As mentioned above, when the clutch 12 is switched from the lock mode to the free mode, a case where the normal mode switching control is executed is lower than a case where the early mode switching control is executed in the engine control after the switching. Accordingly, the ECU 50 of the present embodiment executes the early mode switching control in a case where the target engine speed after the switching to the free mode is bigger than the current engine speed Nea, while executing the normal mode switching control in a case where the target engine speed after the switching to the free mode is smaller than the current engine speed Nea. Thereby, the normal mode switching control is never executed in a case where the target engine speed is lower than the current engine speed. Therefore, it is possible to prevent the engine speed from unnecessarily rising. Accordingly, it is possible to prevent a driver from feeling strange because of the unnecessary rise of engine speed.

Further, the ECU 50 sets a part protection request in response to necessity of protecting the drive device 40 or the first motor generator 7. The part protection request for the drive device 40 is set in a case where, for example, the actuator 41 has overheated because of a long time operation of the actuator 41. The part protection request for the first motor generator 7 is set in a case where, for example, the first motor generator 7 controlled to be in the shut-down state in the lock mode, has produced heat because of friction at the time of idling. Such part protection requests may be set based on the temperature of the actuator 41 and the first motor generator 7, or may be set based on the duration of execution of the lock mode.

In a case where such part protection requests are set, for protecting the drive device 40 or the first motor generator 7, the clutch 12 should be immediately switched from the lock mode to the free mode. Due to this, the ECU 50 executes the early mode switching control in a case where the part protection request has been set, and executes the normal mode switching control in a case where there is no part protection request which has been set. Thereby, it is possible to realize a prompt switching in response to on the part protection request.

Further, the ECU 50 has an inspection device which inspects troubles of the drive device 40 and the first motor generator 7 during the lock mode, and sets a trouble determination request in response to occurrence of the troubles. Since the inspection device inspects the troubles in a conventional way, the explanation thereof will be omitted. In a case where a certain trouble of the drive device 40 or the first motor generator 7 occurs, as with the part protection request, the clutch 12 should be immediately switched from the lock mode to the free mode. Accordingly, in a case where the trouble determination request has been set, the ECU 50 executes the early mode switching control, and in a case where there is no trouble determination request which has been set, the ECU 50 executes the normal mode switching control. Thereby, it is possible to realize the prompt switching in response to the trouble determination request.

Figure 15:
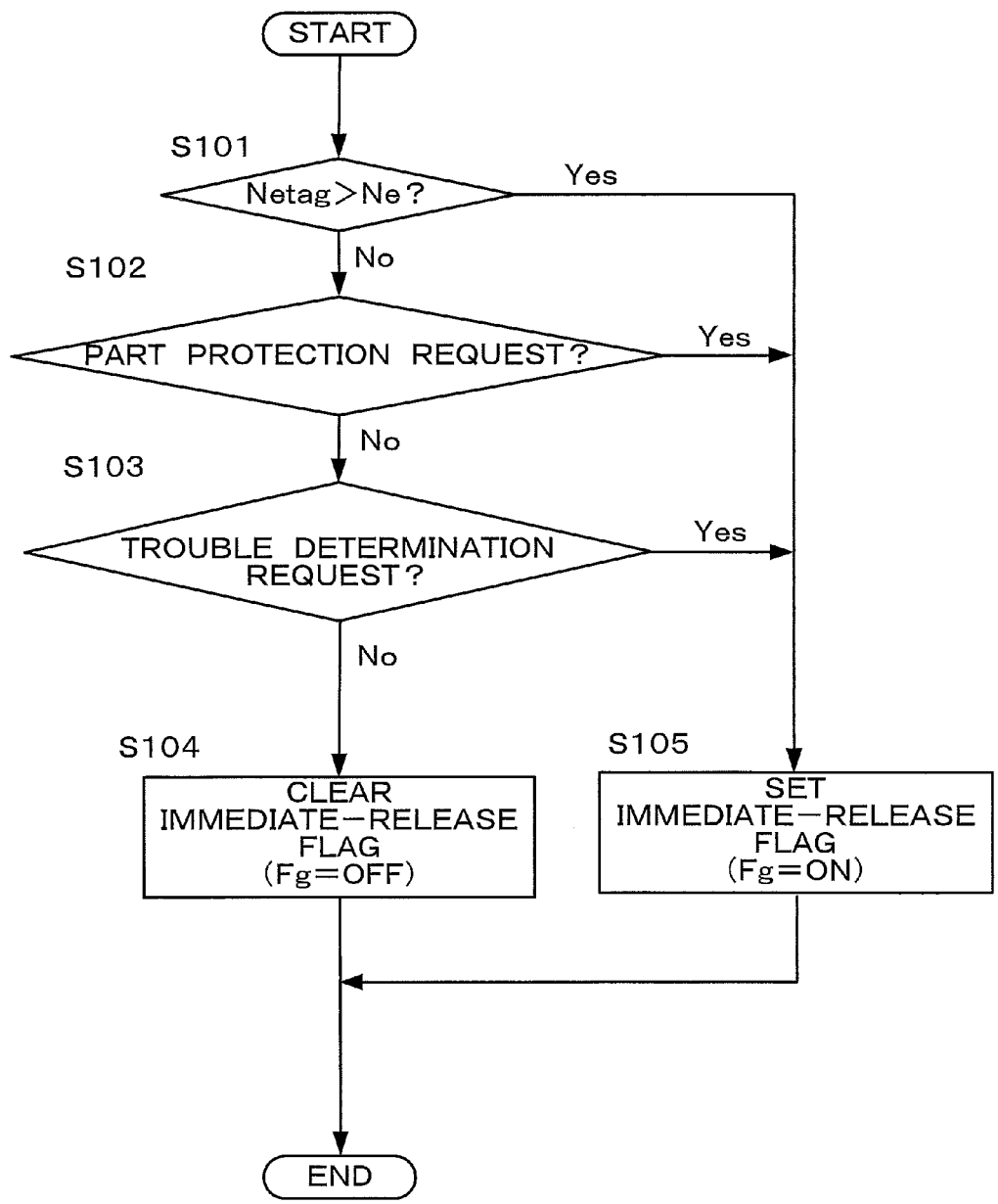
FIG. 15 is a flow chart showing one example of a control routine for setting an immediate-release request.
Figure 16:
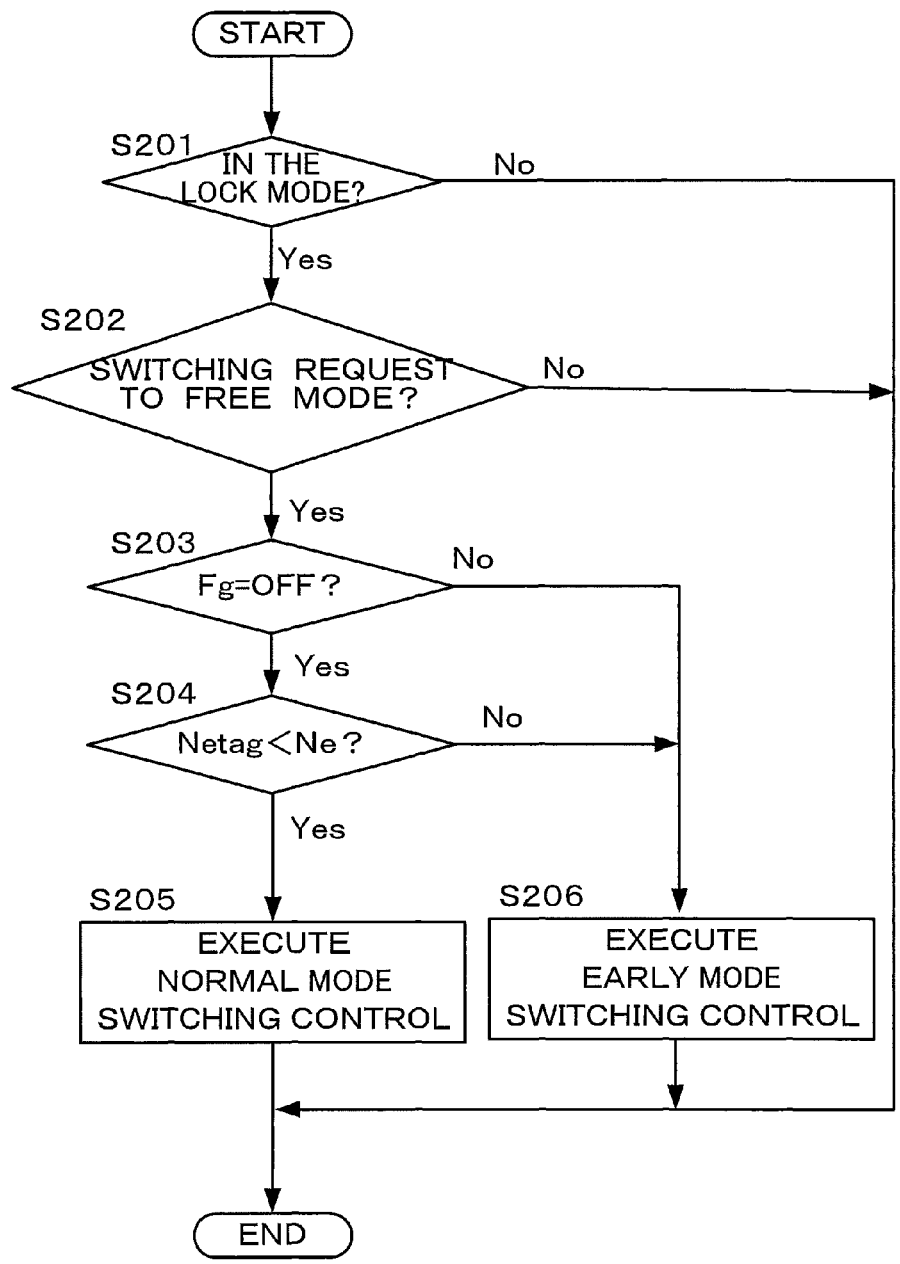
FIG. 16 is a flow chart showing one example of a control routine for determining to execute either the normal mode switching control or the early mode switching control.

In order to execute either the early mode switching control or the normal mode switching control in this way, the ECU 50 executes, for example, each control routine shown in FIGS. 15 and 16. Each program for each control shown in FIGS. 15 and 16 is stored in the ECU 50, and read out as appropriate to be executed repeatedly at a predetermined interval.

As shown in FIG. 15, the ECU 50 executes steps S101 to S103 to determine whether the early mode switching control should be executed or not. Concretely, at step S101, the ECU 50 determines whether it is true that a target engine speed Netag after the switching is bigger than a current engine speed Ne or not. In a case where it is true that the target engine speed Netag is bigger than the current engine speed Ne, the ECU 50 goes to step S105, and in a case where it is not true, the ECU 50 goes to step S102. At step S102, the ECU 50 determined whether it is true that the above mentioned part protection request has been set. In a case where it is true that the part protection request has been set, the ECU 50 goes to step S105, and in a case where it is not true, the ECU 50 goes to step S103. At step S103, the ECU 50 determines whether it is true that the above mentioned trouble determination request has been set. In a case where it is true that the trouble determination request has been set, the ECU 50 goes to step S105, and in a case where it is not true, the ECU 50 goes to step S104.

In the present embodiment, the ECU 50 determines that there is a necessity of executing the early mode switching control in a case where an affirmative determination is obtained at any one of steps S101 to S103. Therefore, at step S105, the ECU 50 sets an immediate-release request flag Fg to ON (Fg=ON) which manages whether there is an immediate-release request corresponding to the necessity. On the other hand, in a case where negative determinations are obtained at all steps S101 to S103, there is no necessity of executing the early mode switching control. Accordingly, the ECU 50 clears the immediate-release request flag Fg (FG=OFF) at step S104.

As shown in FIG. 16, at step S201, the ECU 50 determines whether the clutch 12 is being in the lock mode. When in the lock mode, the ECU 50 goes to step S202, and when not in the lock mode, the ECU 50 skips the following process and ends the control routine of this turn.

At step S202, the ECU 50 determines whether it is true that there is the switching request for switching the operational mode of the clutch 12 from the lock mode to the free mode. In a case where it is true, the ECU 50 goes to step S203, and in a case where it is not true, the ECU 50 skips the following process and ends the control routine of this turn.

At step S203, the ECU 50 determines whether it is true that a state of the immediate-release request flag Fg is a cleared state, that is, that is, Fg=OFF is true. In a case where it is true that the state of the immediate-release request flag Fg is the cleared state, the ECU 50 goes to step S204, and in a case where it is not true, that is, in a case where the immediate-release request flag Fg is set to ON, the ECU 50 goes to step S206.

At step S204, the ECU 50 determines whether the target engine speed Netag after the switching of the operational mode is smaller than the current engine speed Ne. In a case where it is true that the current engine speed is bigger than the target engine speed Netag, the ECU 50 goes to step S205, and in a case where it is not true, the ECU 50 goes to step S206.

At step S205, the ECU 50 executes the normal mode switching control in accordance with the above mentioned procedures. At step S206, the ECU 50 executes the early mode switching control in accordance with the above mentioned procedures.

Figure 17:
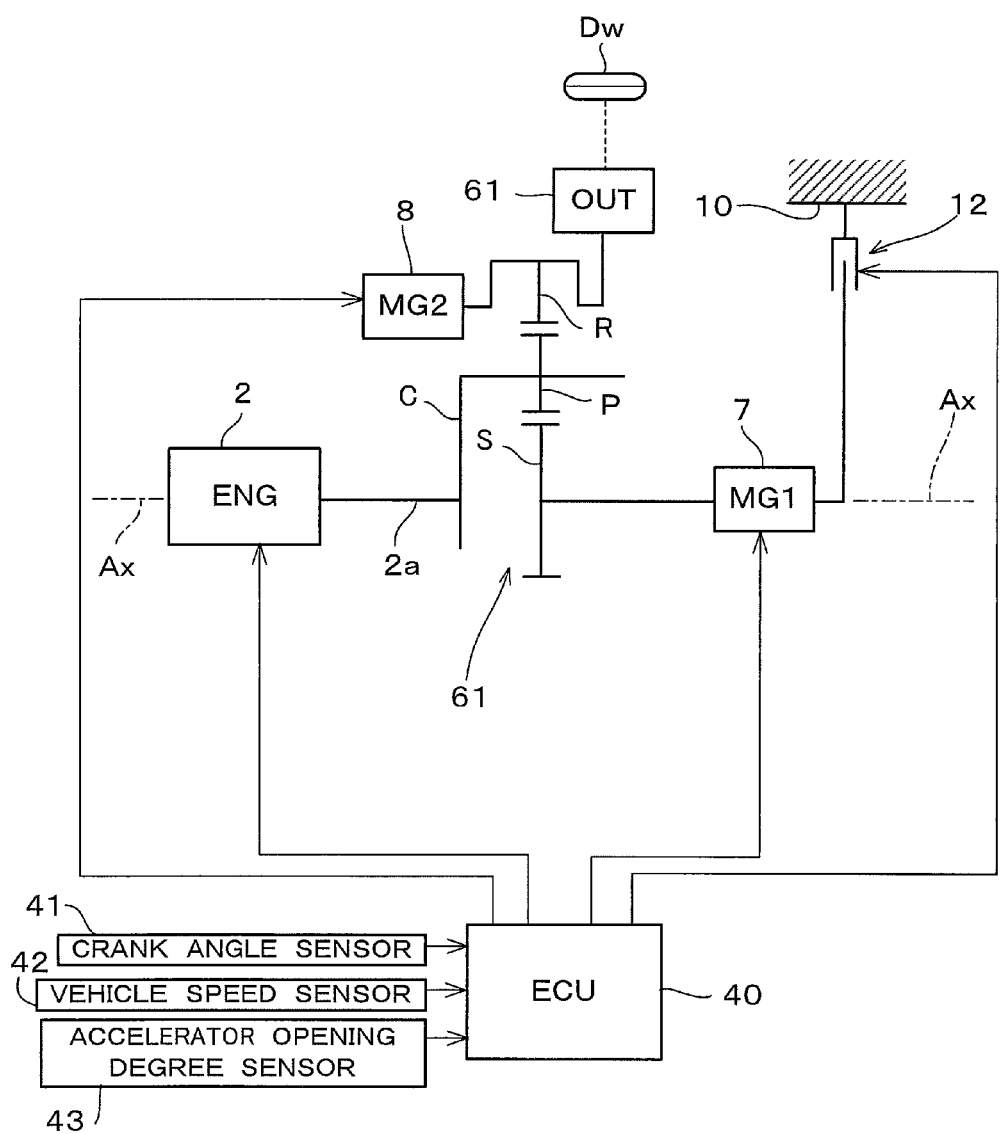
FIG. 17 is a diagram schematically showing a configuration of a hybrid vehicle where a clutch system according to a second embodiment is applied.

According to the control routines shown in FIGS. 15 and 16, it is possible to determine to execute either the normal mode switching control or the early mode switching control depending on the target engine speed after the switching to the free mode, the necessity of early completion of switching to the free mode, and the other circumstances. The clutch system of the present invention is configured by a combination of the clutch 12 and the ECU Second Embodiment Next, in reference to FIGS. 17 and 18, a second embodiment of the present invention will be explained. FIG. 17 shows an outline of a vehicle 1B where a clutch system of the second embodiment is applied. The vehicle 1B is different from the vehicle 1A of the first embodiment in a structure of a power split mechanism 60, a structure from the power split mechanism 60 to the drive wheal Dw, and a position where the clutch 12 is mounted. Since the other structures of the vehicle 1B are the same as the ones of the vehicle 1A, the reference symbols shared with the vehicle 1A are assigned to the structures shared with the vehicle 1A respectively in FIG. 17, and the explanation of them will be omitted.

The power split mechanism 60 is configured as a single-pinion-type planetary gear mechanism. The power spilt mechanism 60 has a sun gear S as an external gear; a ring gear R as an internal gear; and a carrier C which holds a pinion P rotatably and revolvably, the pinion P engaging the gears S and R. The sun gear S, the ring gear R, and the carrier C functions as three rotational elements capable of rotating differentially to each other. To the sun gear S, the first motor generator 7 and the rotational plate 21 of the clutch 12 mentioned later are connected. To the carrier C, the internal combustion engine 2 is connected. To the ring gear R, an output portion 61 is connected, the output portion 61 including unillustrated gear trains and the like for outputting torque to the drive wheel Dw. In the second embodiment, the sun gear S corresponds to the first rotational element of the present invention, the carrier C corresponds to the second rotational element of the present invention, and the ring gear R corresponds to the third rotational element of the present invention. As apparently shown at a velocity diagram in FIG. 18, when these three rotational elements are disposed on the velocity diagram, they are arranged in this order: the sun gear S as the first rotational element; the carrier C as the second rotational element; and the ring gear R as the third rotational element.

In the second embodiment, the clutch 12 mounted to the vehicle 1B functions as a brake which intervenes between the sun gear S and the case 10, and the rotational plate 21 of the clutch 12 is provided to the sun gear S. As with the first embodiment, the clutch 12 is configured so as to select its operational mode between a lock mode and a free mode. In the lock mode, a state is switched between a state that torque transmission from the sun gear S to the case 10 is allowed and the sun gear S is fixed in a case where a rotational direction of the sun gear S is the positive rotational direction Ra; and a state that the torque transmission from the sun gear S to the case 10 is blocked and the sun gear S is released in a case where the rotational direction is the negative rotational direction Rb which is opposite to the direction Ra. In the free mode, a state that the torque transmission from the sun gear S to the case 10 is blocked and the sun gear S is released is maintained, regardless of whether the rotational direction of the sun gear S is the positive rotational direction Ra or the negative rotational direction Rb.

The vehicle 1B switches its drive mode between a motor lock mode and a motor free mode by switching the operation mode of the clutch 12 between the lock mode and the free mode. As with the first embodiment, the switching of the drive mode is executed by the ECU 50. In the motor lock mode, the clutch 12 is controlled to be in the lock mode, and also the first motor generator 7 is controlled to stop a function as an electric motor or a power generator and to be in a shut-down state where the first motor generator 7 is capable of idling. Thereby, it is possible to avoid a power circulation which deteriorates system efficiency while possible to avoid overheat and the like of the first motor generator 7. On the other hand, in the motor free mode, the clutch 12 is controlled to be in the free mode, and also the motor torque and motor rotational speed of the first motor generator 7 are controlled so that the internal combustion engine 2 is operated on a highly-efficient operating point.

Figure 18:
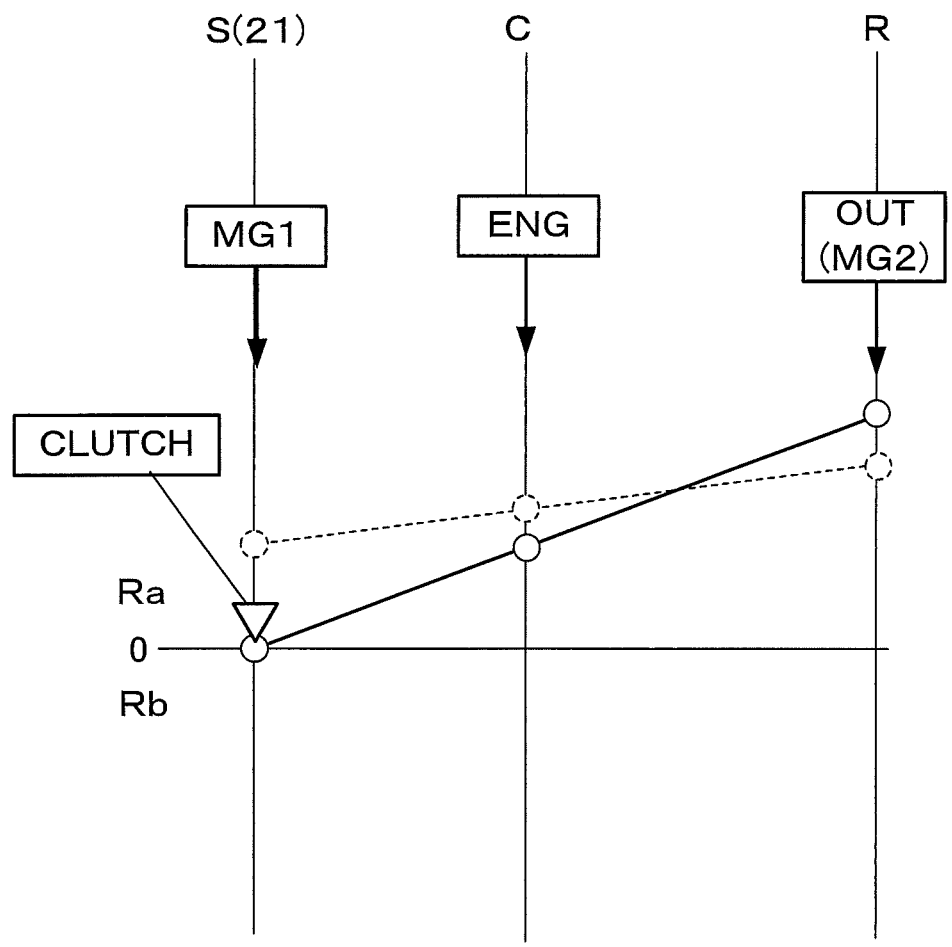
FIG. 18 is a velocity diagram of a power split mechanism according to the second embodiment.

As shown by a solid line in FIG. 18, in a case where the clutch 12 is in the lock mode, the rotational plate 12 receiving reaction torque caused by the internal combustion engine 2 is inhibited to rotate in the positive rotational direction Ra. Due to this, as long as a positive-directional engine torque is outputted from the internal combustion engine 2, the rotational speed of the rotational plate 21 is zero in a state of making torque act on the rotational plate 21 in the positive rotational direction R. Therefore, the transmission ratio of the output portion 61 is determined uniquely by the gear ratio of the power spilt mechanism 60. Thereby, the transmission ratio goes into a fixed state. On the other hand, as shown by a broken line in FIG. 18, in a case where the clutch 12 is in the free mode, since the rotational plate 21 is released with respect to both of the positive rotational direction Ra and the negative rotational direction Rb, it is possible to change continuously the transmission ratio of the output portion 61 with respect to the engine speed by controlling the motor torque and motor rotational speed of the first motor generator 7.

As understandably shown in FIG. 18, also in the second embodiment, as with the first embodiment, in a case of the early mode switching control, there is a characteristic feature that the engine speed after switching to the free mode is equal to or rises from the engine speed shortly before the switching. In a case of the normal mode switching control, since the switching from the lock mode to the free mode is completed after the rotational plate 21 is made to start rotating in the negative rotational direction Rb, there is a characteristic feature that the engine speed after switching to the free mode becomes lower than the engine speed shortly before the switching. Further, also in the second embodiment, with respect to the part protection request and the trouble determination request for the drive device 40 and the first motor generator 7, there are the same circumstances as in the first embodiment. Accordingly, also in the second embodiment, when the clutch 12 is switched from the lock mode to the free mode in order for the drive mode to be switched to the motor free mode during the motor lock mode, as with the first embodiment, the ECU 50 executes either the normal mode switching control or the early mode switching control depending on the situation. A concrete way how the ECU 50 determines which mode switching control should be executed is similar to the way in the first embodiment. That is, the control routines which should be executed by the ECU 50 in the second embodiment may be the same as the control routines shown in FIGS. 15 and 16 used in the first embodiment.

According to the second embodiment, as with the first embodiment, it is possible to determine to execute either the normal mode switching control or the early mode switching control depending on the target engine speed after the switching to the free mode, the necessity of early completion of switching to the free mode, and the other circumstances.

The present invention is not limited to the above each embodiment, and can be executed in various embodiments within a subject matter of invention. In the above embodiment, the clutch system as one aspect of the present invention is applied to a hybrid vehicle. However, there is no particular limitation with respect to an object which the clutch system is applied to. Regardless of whether an embodiment is for a vehicle or not, the present invention may be executed in the embodiment. For example, the clutch system may be applied to an apparatus where torque transmission is performed, such as an automatic transmission.

In the clutch system above mentioned, a drive power produced by the actuator of the drive device makes the selector plate rotate toward the lock position, and the return spring biases the selector plate in a direction heading to the release position. The present invention may be executed even if a correlation between the direction of drive power of the actuator and the direction where the selector plate is biased by the return spring is set oppositely to the correlation of the above mentioned embodiments. That is, the clutch system of the present invention may be executed in such an embodiment that a drive power produced by the actuator of the drive device makes the selector plate rotate toward the release position, and the return spring biases the selector plate in a direction heading to the lock position. In this case, at the time of executing the early mode switching control, it is necessary to control the drive power of the actuator as appropriate when the selector plate is made to go into the waiting state and when the selector plate is moved to the release position from the waiting state respectively.

EXPLANATION OF REFERENCES 1A and 1B a vehicle
2 an internal combustion engine
5 a power split mechanism (differential mechanism)
7 a first motor generator (a motor generator)
11, 61 an output portion
12 a clutch
15 a fixed shaft (a fixed element)
20 a fixed plate
21 a rotational plate
22 a selector plate
22a a non-formation portion
26 a pawl member
30 a recess
31 an aperture
40 a drive device
41 an actuator
47 a return spring (a biasing device)
50 an ECU (a control device)
DW a drive wheel

The invention claimed is:
1. A clutch system comprising:
a fixed plate being fixed so as to restrict rotation;
a rotational plate where at least one recess is formed, each of the at least one recess opening at a surface of the rotational plate, the surface facing the fixed plate;
at least one pawl member, each of the at least one pawl member being provided to the fixed plate protrudably toward the rotational plate from the fixed plate, and in a case of protruding from the fixed plate, engaging with the recess formed in the rotational plate only when the rotational plate is rotating in a predetermined rotational direction;
a selector plate which is disposed between the fixed plate and the rotational plate, and has at least one aperture, each of the at least one aperture being formed to let the pawl member through, the selector plate being capable of rotating relatively to the fixed plate between a lock position where the pawl member is allowed to protrude from the fixed plate by passing through the aperture and a release position where the pawl member is restricted so as not to protrude from the fixed plate by contacting with a non-formation portion where no aperture is formed;
a drive device which rotatively drives the selector plate; and
a computer functioning, by executing a computer program, as a control device, the control device being configured so as to rotate the selector plate from the lock position to the release position by operating the drive device so that an operational mode switches between a lock mode where the selector plate is located at the lock position and a free mode where the selector plate is located at the release position, and also configured so as to control torque acting on the rotational plate, wherein
the control device is further configured so as to execute, in a case of switching the operational mode from the lock mode to the free mode, an early mode switching control where, while making the selector plate go into a waiting state that the pawl member protruding from the fixed plate abuts against the non-formation portion, the control device makes a negative torque act on the rotational plate in a negative rotational direction opposite to the predetermined rotational direction, and the control device controls the negative torque to rotate the selector plate of the waiting state up to the release position.

2. The clutch system according to claim 1, wherein the drive device comprises: a biasing device which produces torque which biases the selector plate in a direction heading to the release position; and an actuator which produces a drive power for resisting the torque produced by the biasing device to rotate the selector plate toward the lock position, and the control device is configured to, when executing the early mode switching control, rotate the selector plate so that the selector plate goes into the waiting state, by lowering the drive power of the actuator.

3. The clutch system according to claim 1, being applied to a hybrid vehicle, the hybrid vehicle comprising: an engine; a motor generator; an output portion which outputs torque to a drive wheel; and a differential mechanism which has at least three rotational elements which are capable of rotating differentially to each other are provided, three of the at least three rotational elements being connected to the engine, the motor generator, and the output portion respectively, wherein the fixed plate is fixed to a predetermined fixed element of the hybrid vehicle, the rotational plate is provided to the differential mechanism so as to receive a reaction torque caused by an engine torque of the engine, and the control device is configured to control the torque acting on the rotational plate by operating the motor generator.

4. The clutch system according to claim 3, wherein the control device is configured to be capable of executing a normal mode switching control where the control device rotates the rotational plate in the negative rotational direction by making the negative torque act on the rotational plate in the negative rotational direction, and, after a rotational speed of the rotational plate with respect to the negative rotational direction reaches a predetermined criterion, the control device rotates the selector plate from the lock position to the release position by operating the drive source, and also configured so as to execute selectively either the early mode switching control or the normal mode switching control in a case of switching the operational mode from the lock mode to the free mode.

5. The clutch system according to claim 4, wherein the control device is configured to execute the early mode switching control in a case where a target engine speed of the engine after switching to the free mode is bigger than a current engine speed, and to execute the normal mode switching control in a case where the target engine speed is smaller than the current engine speed.

6. The clutch system according to claim 4, wherein the control device is configured to set in the lock mode, a part protection request in response to a necessity of protecting the drive device or the motor generator, and to execute the early mode switching control in a case where the part protection request has been set, while executing the normal mode switching control in a case where no part protection request has been set.

7. The clutch system according to claim 4, wherein the control device is configured to set in the lock mode, and to execute the early mode switching control in a case where a trouble determination request has been set.

8. The clutch system according to claim 3, wherein the differential mechanism has four rotational elements as the at least three rotational elements, wherein the motor generator is connected to a first rotational element of the four rotational elements, the rotational plate is connected to a second rotational element of the four rotational elements, the engine is connected to a third rotational element of the four rotational elements, and the output portion is connected to a forth rotational element of the four rotational elements, wherein the differential mechanism is configured so that the first rotational element, the second rotational element, the third rotational element, and the fourth rotational element would be arranged in this order in a velocity diagram.

9. The clutch system according to claim 3, wherein the differential mechanism has three rotational elements as the at least three rotational elements, wherein the motor generator and the rotational plate are connected to a first rotational element of the three rotational elements, the engine is connected to a second rotational element of the three rotational elements, and the output portion is connected to a third rotational element of the three rotational elements, wherein the differential mechanism is configured so that the first rotational element, the second rotational element, and the third rotational element would be arranged in this order in a velocity diagram.

* * * * *